United States Patent [19]

Grau et al.

[11] Patent Number: 5,862,451
[45] Date of Patent: Jan. 19, 1999

[54] CHANNEL QUALITY MANAGEMENT IN A CABLE TELEPHONY SYSTEM

[75] Inventors: Alan L. Grau, Lombard; Richard J. Corrigan, Lagrange; Kurt W. Steinbrenner, Bartlett; Timothy M. Burke, Algonquin, all of Ill.

[73] Assignee: Motorola, Inc., Schaumburg, Ill.

[21] Appl. No.: 589,842

[22] Filed: Jan. 22, 1996

[51] Int. Cl.[6] ............... H04H 1/02; H04B 17/00; H04N 7/14; H04N 17/00
[52] U.S. Cl. ............... 455/5.1; 348/12; 348/192; 455/67.1
[58] Field of Search ............... 455/3.1, 4.1, 4.2, 455/5.1, 6.1, 6.2, 6.3, 67.1–71; 348/6, 7, 10, 12, 13, 180, 192, 193

[56] References Cited

U.S. PATENT DOCUMENTS

| | | | |
|---|---|---|---|
| 5,594,726 | 1/1997 | Thompson et al. | 455/5.1 X |
| 5,606,725 | 2/1997 | Hart | 455/5.1 |
| 5,623,422 | 4/1997 | Williams | 455/5.1 |

OTHER PUBLICATIONS

Generic Criteria for Version 0.1 Wireless Access Communications Systems (WAS) published by Bellcore, 1993 (TR–INS–0011313), specifically Section 6.

Personal Access Communications System Air Interface Standard J–STD–014 (PACS) published by Technical Ad Hoc Group 3 of the T1/T1A Joint Technical committee, specifically Section 6.

U. S. Patent Application, Williams, James M., Method for Prioritizing Channels in a Communication System, filed Dec. 21, 1994, Serial #08/316,064, Docket #CE02667R.

U.S. Patent Application, Williams et al., Method for Avoiding Interference in a Cable Telephony System, filed Nov. 17, 1995, Serial #08/560,557, Docket #CE02640R.

U.S. Patent Application, Baum et al., Method and Apparatus for Mitigting Itrfrence in a Communication System, filed Dec. 19, 1994, Serial #08/359,220, Docket #CE02719R.

*Primary Examiner*—Nathan Flynn
*Assistant Examiner*—John W. Miller
*Attorney, Agent, or Firm*—J. Ray Wood

[57] ABSTRACT

A method and apparatus in a communication system (100) for allocating and controlling data transmissions to and from communications unit (134) in communications system (100). The communication systems (100) includes a cable distribution network (106) with a base communications unit (102) and a number of downstream communications units (134) all connected to the cable distribution network (106). A plurality of channels are used to transmit data transmissions between the base communications unit (100) and the downstream communications unit (134). Uplink and downlink channels are monitored to determine channel quality for each of the channels in communications system (100). The determined channel quality is used to both initiate transfers of communications links to other frequencies and for assigning channels to various communications units (134).

48 Claims, 12 Drawing Sheets

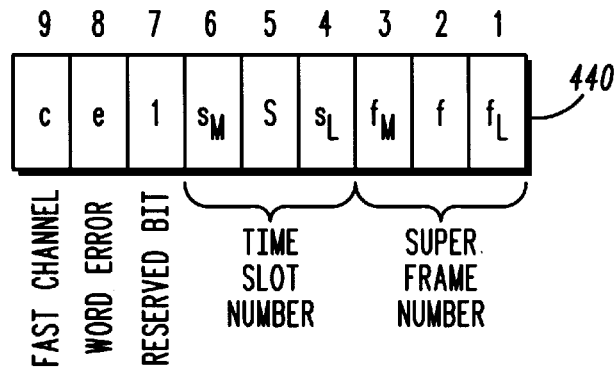
FIG.4C
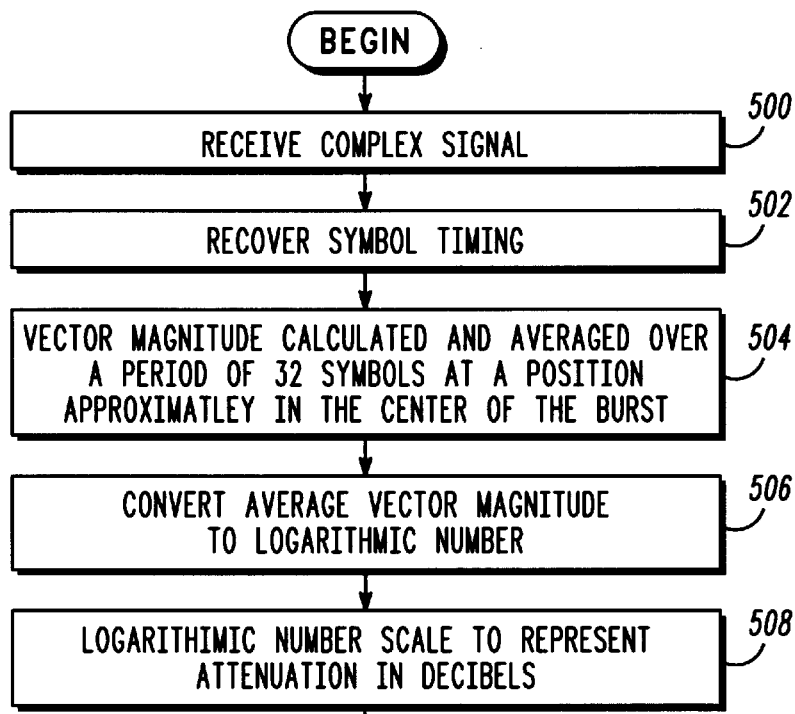
FIG.5
| CLASS | HIGH QM | LOW QM |
|---|---|---|
| 1 | 9 | 8 |
| 2 | 8 | 6 |
| 3 | 6 | 4 |
| 4 | 4 | 0 |
FIG.6A

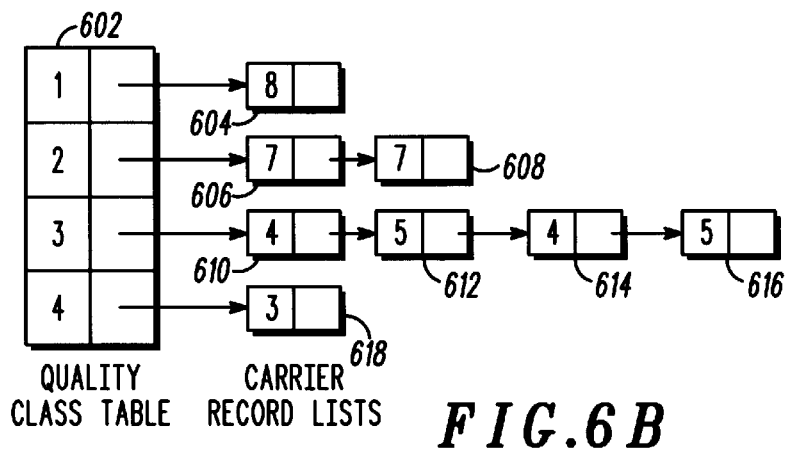
FIG.6B
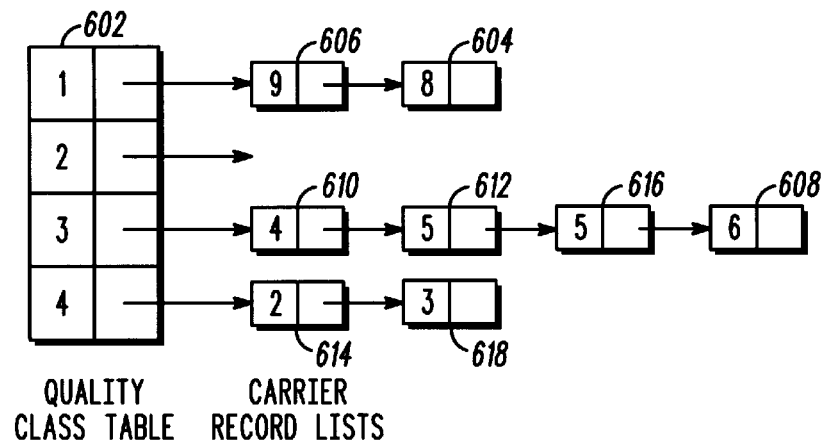
FIG.6C
FIG.6D
| 650 | |
|---|---|
| 652 | QM VALUE |
| 654 | AVAILABLE BANDWIDTH |
| 656 | 0 |
| 658 | 1 |
| 660 | 2 |
| 662 | 3 |
| 664 | 4 |
| 666 | 5 |
| 668 | 6 |
| 670 | 7 |

CHANNEL QUALITY MANAGEMENT IN A CABLE TELEPHONY SYSTEM

BACKGROUND OF THE INVENTION

The present invention relates generally to communications systems and in particular, to a method and apparatus for managing channels in a communications system. Still more particularly, the present invention is directed towards a method and apparatus for managing channel quality in cable telephony system through measuring the quality of channels and assigning channels based on the measurements of channel quality.

Communications systems, such as a cable communications system, provide for data transmission using one or more radio frequency channels. During the transmission of data between communications units in a communications system, the onset of interference at a particular frequency may be sudden, and possibly catastrophic, rendering the particular frequency, also called a "channel," unusable. Further, interference in the form of ingress noise in a single incident can cause interference to several channels. This type of ingress noise or interference can be caused by wireless systems, such as cellular, as well as other types of equipment radiation, such as commercial and industrial equipment.

Additionally, various communications units using the cable communications system may require different levels of channel quality, depending on the type of data transmissions they use. For example, data transmissions for interactive multi-media services require a higher channel quality than data transmission carrying typical analog voice conversations. Accordingly, the interference in one channel used by a communications unit may be acceptable while the same interference is unacceptable for another communications unit.

Therefore it would be advantageous to have a method and apparatus for determining channel quality such that interference can be avoided and channel allocations can be made based on channel quality.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4C is a diagram of a burst in a downlink control channel from a CCU to a CAU;

FIG. 5 is a flowchart of a process for obtaining a power attenuation level from a signal received at a cable control unit;

FIG. 6A is a diagram of channel quality classes;

FIG. 6B is a diagram of traffic (TCH) ranking in quality class tables;

FIG. 6C is a depiction of how channel records assignments can be changed in response to receiving a new quality metric ranking (QM-R) report;

FIG. 6D is a diagram of a channel record in a channel quality class table;

DETAILED DESCRIPTION OF THE DRAWINGS

The present invention provides a method and apparatus for obtaining channel quality metrics in a communications system along with a method and apparatus for managing channels based on the obtained quality metrics. Quality metrics are measured for uplink channels in both busy and idle states and for downlink channels in busy states in a cable telephony communications system. As used in the present description, "uplink" refers to communications transmitted from a subscriber unit in the field to the cable head end, while "downlink" reefers to communications transmitted from the head end to a subscriber unit(s) in the field. Quality metrics are the measurement of the quality of the radio frequency (RF) signal for a channel. Identification of channel quality, initiation of channel (link) transfers, and allocation of traffic channels are then based on these measured quality metrics. The following description begins by explaining the environment in which the present invention is implemented. The description then sets forth the types of quality metrics measured and a description of how the quality metrics are used according to the present invention. Thereafter, an explanation of the processes involved in obtaining quality metrics and managing channels in a communications system is provided.

Environment

Figure 1:
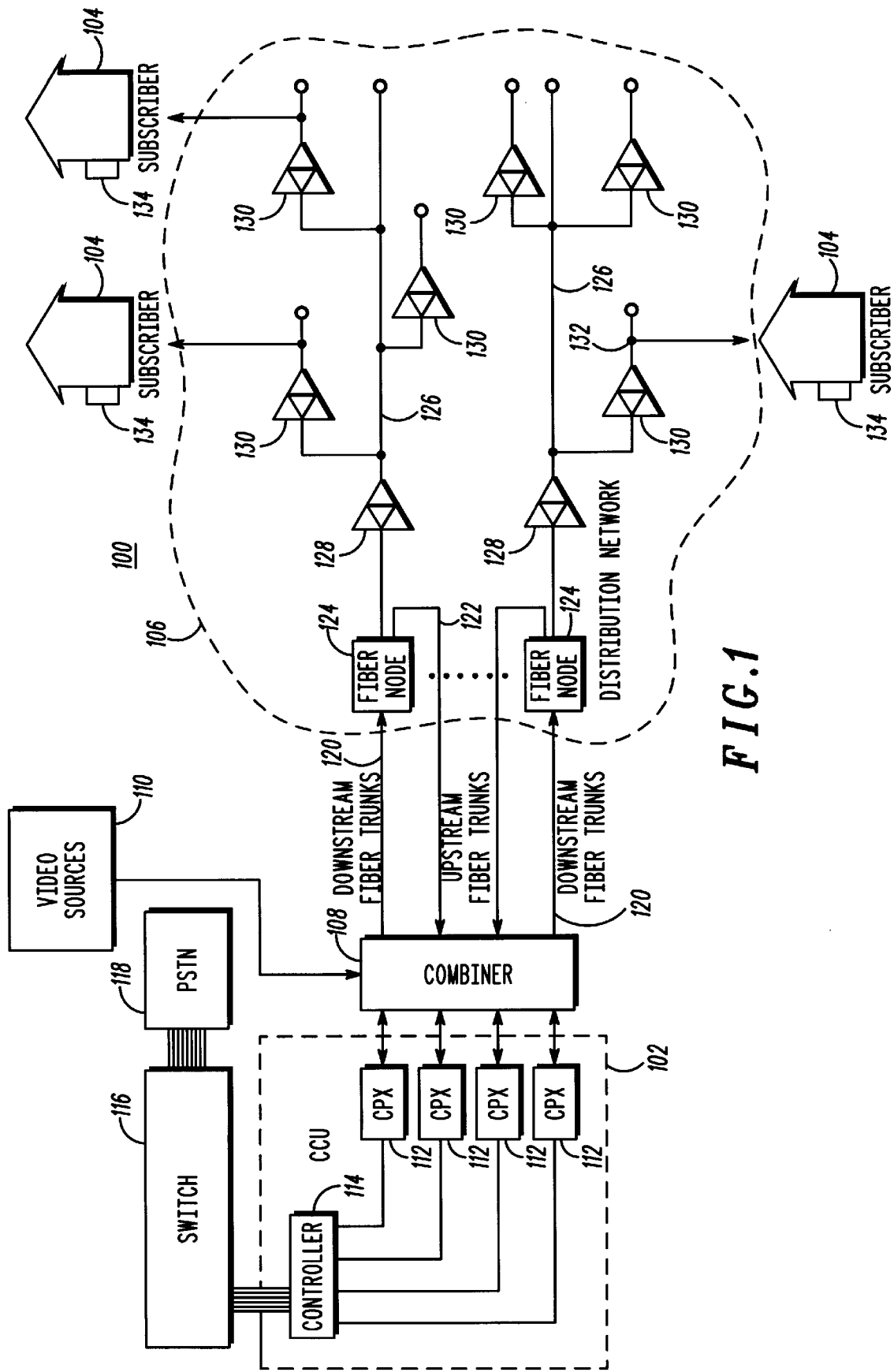
FIG. 1 is a diagram of a communications system in which the present invention may be implemented.

With reference now to the figures, and in particular with reference to FIG. 1, a diagram of a communications system 100 is illustrated in which the present invention may be implemented. Communications system 100 is an example of a basic cable system architecture that is a hybrid cable system using a combination of fiber and coaxial cable to distribute subscriber services to customer premises equipment. Alternatively, communications system 100 may consist entirely of coaxial cable as well as other configurations. Regardless of the cable infrastructure, a cable branch will serve a distribution area shared by a community of subscribers. In the depicted example, communications system 100 is a cable telephony communications system that provides telephone services along with cable television services on a coaxial fiber-optic cable television infrastructure.

Communications system 100 includes a cable control unit (CCU) 102 or some other base communications unit that is connected to subscribers 104 by a distribution network 106 and a combiner 108. Combiner 108 has an input for video sources 110. CCU 102 also includes cable port transceivers (CPXs) 112, which are connected to combiner 108. These cable port transceivers generate downstream carrier channels in communications system 100. Combiner 108 receives modulated RF channels from video sources 110 and from CPXs 112 in CCU 102 and sums these signals together to be sent over distribution network 106. CPXs 112 are controlled by a controller 114, which provides all functions necessary to support the data link portion of the system. The headend typically includes CCU 102, combiner 108, and video sources 110. Digital switch 116 may be in a remote location from the headend or may be located at the headend itself. These components are the headend equipment responsible for providing access and management of services to a cable branch in communications system 100. Controller 114 in CCU 102 is connected to switch 116 through digital carrier facilities, such as T1 or E1, which is in turn connected to a public switching telephone network (PSTN) 118. Switch 116 may be, for example, a class 5 TELCO switch.

Transmissions from CCU 102 in distribution network 106 are facilitated by downstream fiber trunks 120 and upstream fiber trunks 122. These fiber trunks are fiber optic cables and are connected to fiber nodes 124. Fiber nodes 124 perform directional conversion between the optical domain of fiber optical cable and the electrical domain of coaxial cable in distribution network 106. Each fiber node 124 has a connection to at least one cable branch 126. In the depicted example, cable branch 126 is comprised of coaxial cable and includes trunk amplifiers 128, which are bi-directional amplifiers in the depicted example. Additionally, bi-directional line extenders 130 are located near taps 132, which are connected to cable access units (CAUs) 134 located at subscriber 104. These CAUs are also called "subscriber communications units". Each cable branch 126 includes one or more serving areas.

CCU 102 is used to provide telephony, integrated services digital network (ISDN) services, digital video, interactive video, or interactive multimedia in communications system 100. Additionally, CCU 102 controls the cable spectrum, infrastructure resources, and services for all CAUs in a serving area, as well as managing multiple serving areas. CAUs 134 provide telephone, ISDN, digital video, interactive video, interactive multimedia, and television services at subscriber premises. Typically, a CAU is mounted on the side of the subscriber's home, or in an unobtrusive place, such as a basement or attic. The CAU manages the uplink and downlink communications paths and transports cable television channels to the subscriber's television.

Cable access units, such as CAUs 134, scan the downstream to acquire frame synchronization with a system broadcast channel (SBC). The preferred system employs Time Division Multiple Access provisioning which means that each RF carrier is divided into several time slots, each time slot being available as a channel, for example, a SBC, a Traffic Channel (TCH), or a System Access Channel (SAC), as detailed further below. The SBC occupies a time slot in one of the channels in each cable branch of the cable communications system. Frame synchronization is acquired by means of a known digital correlation process. The system access channel (SAC) and the traffic channel (TCH) also are used in time slots. SACs are used for requesting access to the network and for making TCH assignments. TCHs are the channels that carry the phone calls, or other data communications desired by the subscriber.

Figure 2A:
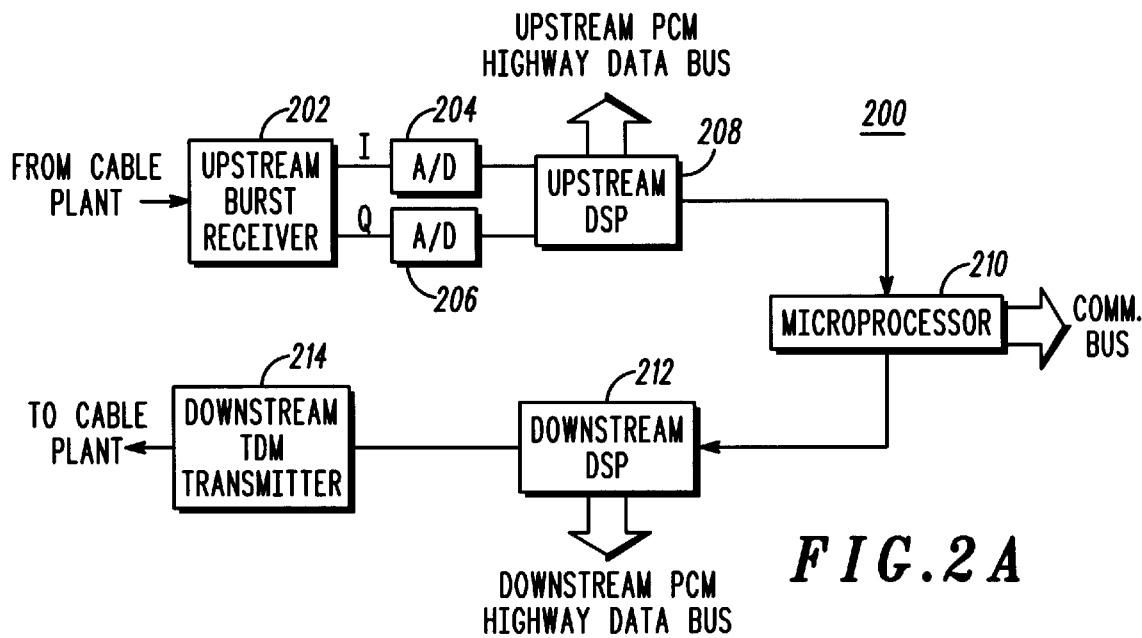
FIG. 2A is a block diagram of components in a cable port transceiver (CPX) in a cable control unit (CCU)

Turning next to FIG. 2A, a block diagram of components in a CPX within CCU 102 is depicted according to the present invention. CPX 112 includes upstream burst receiver 202, A/D converters 204 and 206, upstream DSP 208, microprocessor 210, downstream DSP 212, and downstream transmitter 214.

In CPX 112, upstream burst receiver 202 receives a time division multiple access (TDMA) burst from a CAU and down converts the burst to baseband quadrature I and Q signals. A "burst" is a fixed transmission of data in bits bearing information. The burst is $\pi/4$—DQPSK modulated. These baseband I and Q signals are converted to a digital signal by analog to digital (A/D) converters 204 and 206 and processed by upstream digital signal processor (DSP) 208. In the depicted example, A/D converters 204 and 206 are 8-bit A/D converters. Upstream DSP 208 sends the processed information to microprocessor 210. Additionally, microprocessor 210 is connected to a microprocessor in controller 114, which is described in more detail in FIG. 2B below. Upstream DSP 208 sends pulse code modulated (PCM) information back to controller 114 on an upstream PCM highway bus while downstream DSP 212 receives PCM information from controller 114 via downstream PCM highway bus.

Microprocessor 210 sends messages back to the CAU through downstream DSP 212 and downstream TDM transmitter 214, which is connected to the communications network in which the CAU is located. Microprocessor 210 also sends and receives high-level messages, such as control information, to and from controller 114 through communications bus 220.

Upstream DSP 208, microprocessor 210, and downstream DSP 212 make up a processing unit in CPX 112 in FIG. 2A. This microprocessor and the DSPs in CPX 112 form part of a processing unit in CCU 102.

Figure 2B:
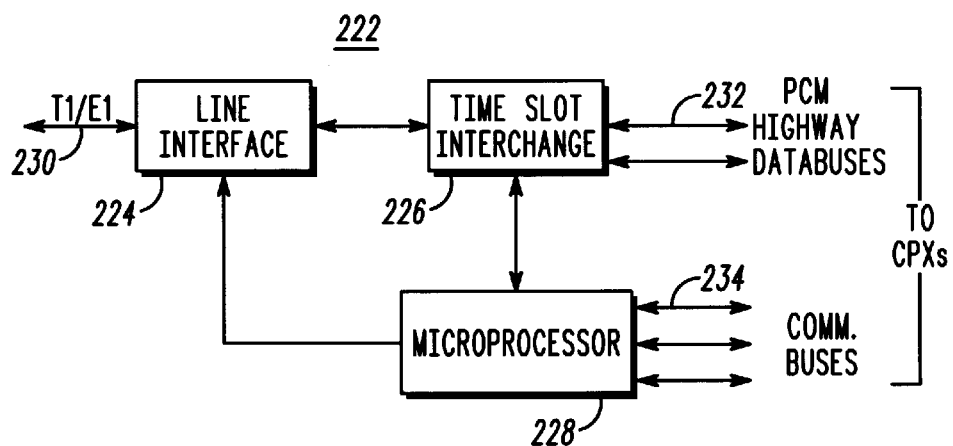
FIG. 2B is a block diagram of components in a controller in a CCU.

Turning next to FIG. 2B, a block diagram of a controller in FIG. 1 is illustrated according to the present invention. Controller 114 includes a line interface 224, a time slot interchange 226, and a microprocessor 228. Line interface 224 provides a communications interface with digital switch 116 in FIG. 1, which may be a local digital switch through T1/E1 interfaces 230. Additionally, controller 114 provides control functions for individual CPXs, such as CPXs 112 within the CCU 102 through communications buses 232 and microprocessor 228.

Specifically, PCM signals are time division multiplexed (TDM) and grouped as sequential time slots on the T1/E1 signals received at line interface 224. The signals are decoded within line interface 224 and separated into individual time slots of PCM data and sent to time slot interchange 226, which provides cross-point switching among its input and outputs. Microprocessor 228 controls the "mapping" of the input/output time slots, which are then concentrated into individual PCM highway data buses 232, which are connected to CPXs in a CCU. In particular, time slot interchange 226 is connected to upstream DSP 208 and downstream DSP 212 in FIG. 2A using PCM highway data buses 232.

Microprocessor 228 controls line interface 224 and time slot interchange 226. Additionally, microprocessor 228 sends control information to the CPXs, using communications buses 234. More specifically, microprocessor 228 in FIG. 2A has a connection to microprocessor 210 in FIG. 2A via buses 234.

Figure 2C:
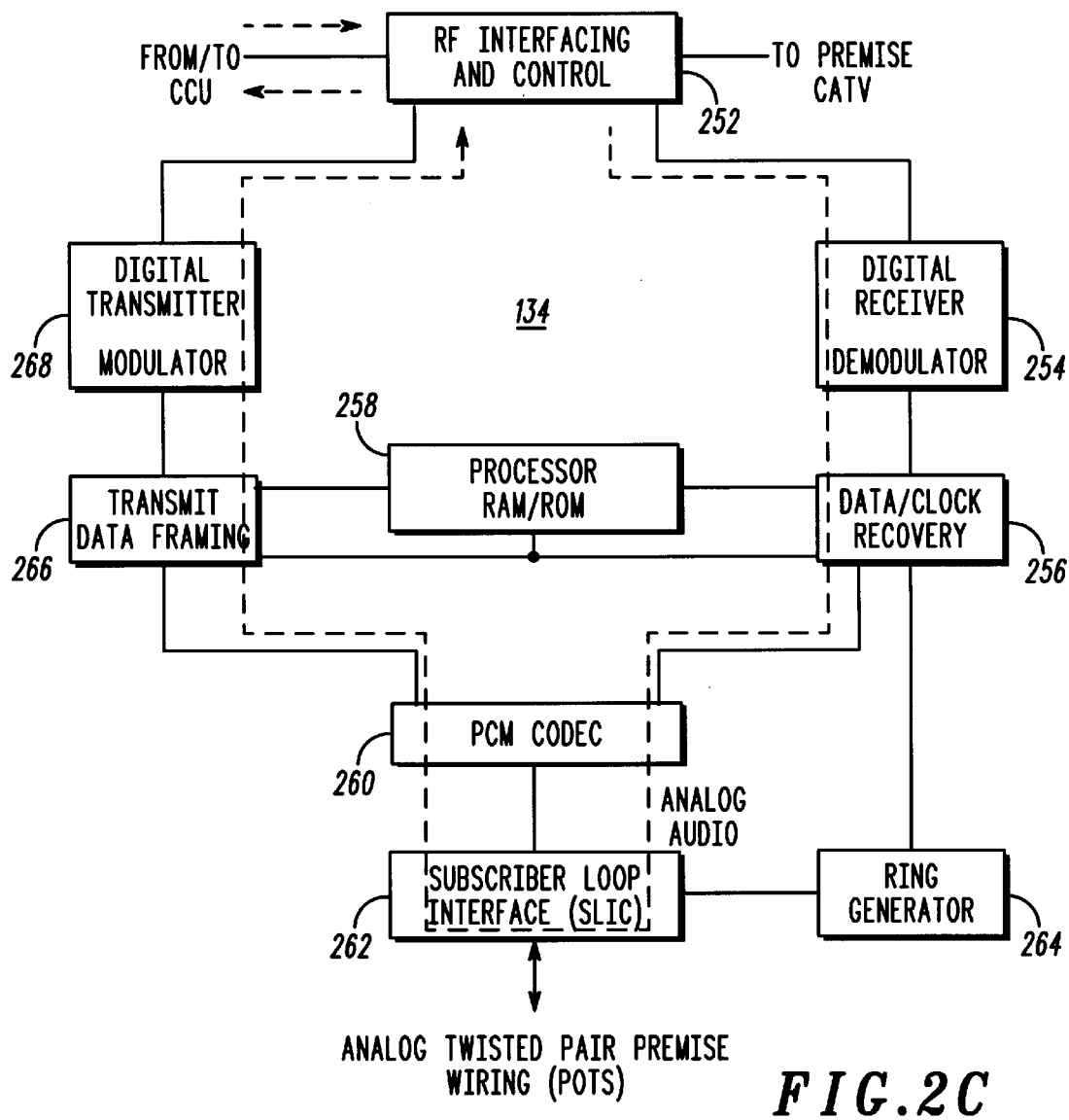
FIG. 2C is a block diagram of components in a cable access unit (CAU) control unit.

With reference now to FIG. 2C, a block diagram of components in a CAU 134 is depicted according to the present invention. CAU 134 is connected to a hybrid coaxial cable in distribution network 106 in FIG. 1 by RF interfacing and control 252, which provides a 75 ohm interface to the hybrid coaxial cable. RF interfacing and control 252 also provides a connection to cable television equipment on the subscriber premises. Additionally, RF interfacing and control 252 includes a control switch to turn on or off signals to cable television systems at the subscriber premises. Data received from the CCU at RF interfacing and control 252 are sent to digital receiver (demodulator) 254. The signals received from the CCU are in a frequency range from about 50 MHz to 750 MHz and converted to a low intermediate frequency (IF) by digital receiver 254. From this form, digital receiver 254 translates the low frequency IF to a baseband π/4 DPQSK modulated signal. Next, the signal is demodulated to obtain bits from the signal. Thereafter, data/clock recovery 256 takes the bits from digital receiver 254 and separates the bits to send to processing unit 258 or pulse code modulated (PCM) coder/decoder (codec) 260. Control information is sent to processing unit 258 while user data is sent to PCM codec 260, which converts the user data into an analog form.

Processing unit 258, in the depicted example, includes one or more microprocessors along with random access memory (RAM) and read only memory (ROM). The RAM and ROM contain data and instructions coding for processes performed by the microprocessors or DSPs within processing unit 258. User information is converted by PCM codec 260 to an analog form and sent to subscriber loop interface (SLIC) 262. SLIC 262 provides basic telephony functions, such as indicating whether a telephone is ringing or off hook, or whether loop closure has occurred. Additionally, SLIC 262 separates duplex signals into a send signal and a receive signal. SLIC 262 and the functions performed by it are well known to those who are skilled in the art. Ring generator 264 actually provides the voltage used to cause the telephone to ring.

User signals from the subscriber premises are sent back through SLIC 262 to PCM codec 260, which transforms the data from an analog form to a digital form for processing by transmit data framing 266. Transmit data framing 266 takes raw speech data and puts this data into the burst for transmission to the CCU. For example, transmit data framing 266 includes the necessary synchronization information and calculates the cyclic redundancy code (CRC) for error checking, which is placed into the error portion of the TDMA frame. Transmit data framing 266 is controlled by processing unit 258 and sends signals in synchronization with the downlink transmissions. This synchronization in transmit data framing 266 is controlled by data/clock recovery 256. In other words, uplink and downlink transmissions to and from CAU 134 are synchronized. Finally, the data, as a burst, is transmitted by digital transmitter (modulator) 268 to RF interfacing and control 252 and back to the CCU as an uplink transmission.

Data carried across distribution network 106 in FIG. 1 may include both voice and non-voice data, such as integrated services digital network (ISDN), digital video, phone data, interactive video, or interactive multimedia services. In the present invention, the transport technology used for the cable telephony exchange service is trunked. In other words, a cable telephony traffic channel is not dedicated to one particular user, but is available to all users on the basis of a request for service. Such an arrangement is called multiple access or subscriber loop concentration.

Typically, once a particular channel is assigned to a subscriber, it is assigned for the duration of a call. When the call is terminated, the temporary assignment to the subscriber is revoked and the channel is made available for a subsequent service request. Consequently, it is possible for a CCU to serve many more subscribers than the channels available in a cable branch. Additionally, the spectrum allocated for the CCU may be used for a different group of subscribers in every cable branch of the cable network.

Figure 3:
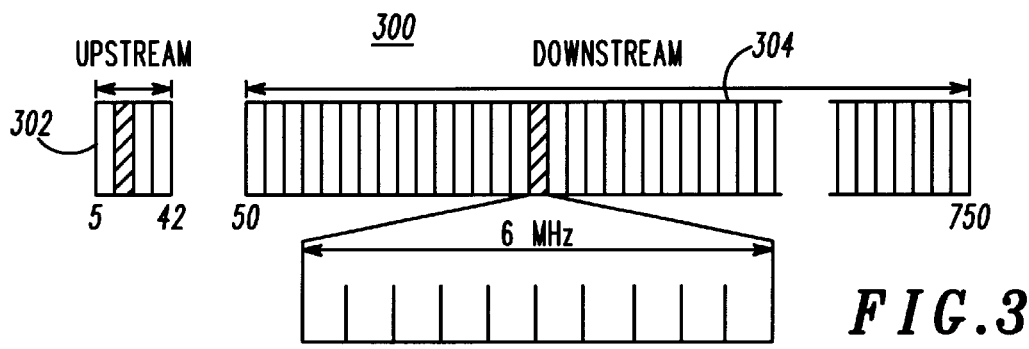
FIG. 3 is an illustration of spectrum allocations for a communications system.

According to the present invention, the cable telephony communications system divides up the radio frequency (RF) spectrum for use with multiple subscribers such that no individual subscriber has a dedicated frequency range. With reference to FIG. 3, an illustration of spectrum allocations for communications system 100 is depicted according to the present invention. The spectrum allocated for service within a single cable branch may be used again for a different group of subscribers in every cable branch of distribution network 106. In the depicted example, RF spectrum 300 includes uplink spectrum 302 and downlink spectrum 304. In the depicted example, uplink spectrum 302 covers a range from 5 MHz to 42 MHz while downlink spectrum 304 covers a range from 50 MHz to 750 MHz. The spectrums are further subdivided into channels that are each 6 MHz in width. In the depicted example, downlink spectrum 304 includes 120 channels with each channel being 6 MHz in width. Although the depicted example shows an uplink spectrum 302 of 5 to 42 MHz and a downlink spectrum 304 from 50 to 750 MHz with each channel having a width of 6 MHz, other spectrums and channel widths may be used according to the present invention.

Communications system 100 is divided up into areas with separate signal paths in which the RF spectrum allocated for the cable telephony service may be used again for a different group of subscribers in each cable branch of the distribution network 106. In the downlink spectrum, a large number of conventional television channels (for example 80 channels, each 6 MHz in width) are conveyed to cable television subscribers. In the reverse, in the uplink spectrum, other communications are provided. A portion of the downlink spectrum and an equal or larger portion in the uplink spectrum are dedicated to a plurality of trunked traffic channels serving a large number of subscribers having telephone and/or other two way service. Within these dedicated spectrum allocations, a number of RF channels are deployed. These RF channels are spaced 600 KHz apart and each channel contains 8 digitally encoded time division multiplexed information bearing channels. Active channels are operated in pairs with one in the uplink segment of the allocation associated with each one in the downlink segments. This association provides for frequency division duplex (FDD) operations.

Figure 4A:
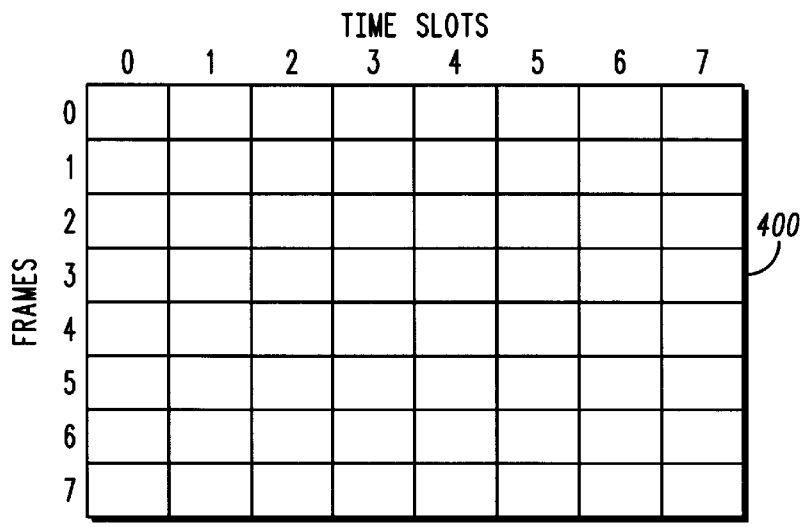
FIG. 4A is a diagram of a superframe.
Figure 4B:
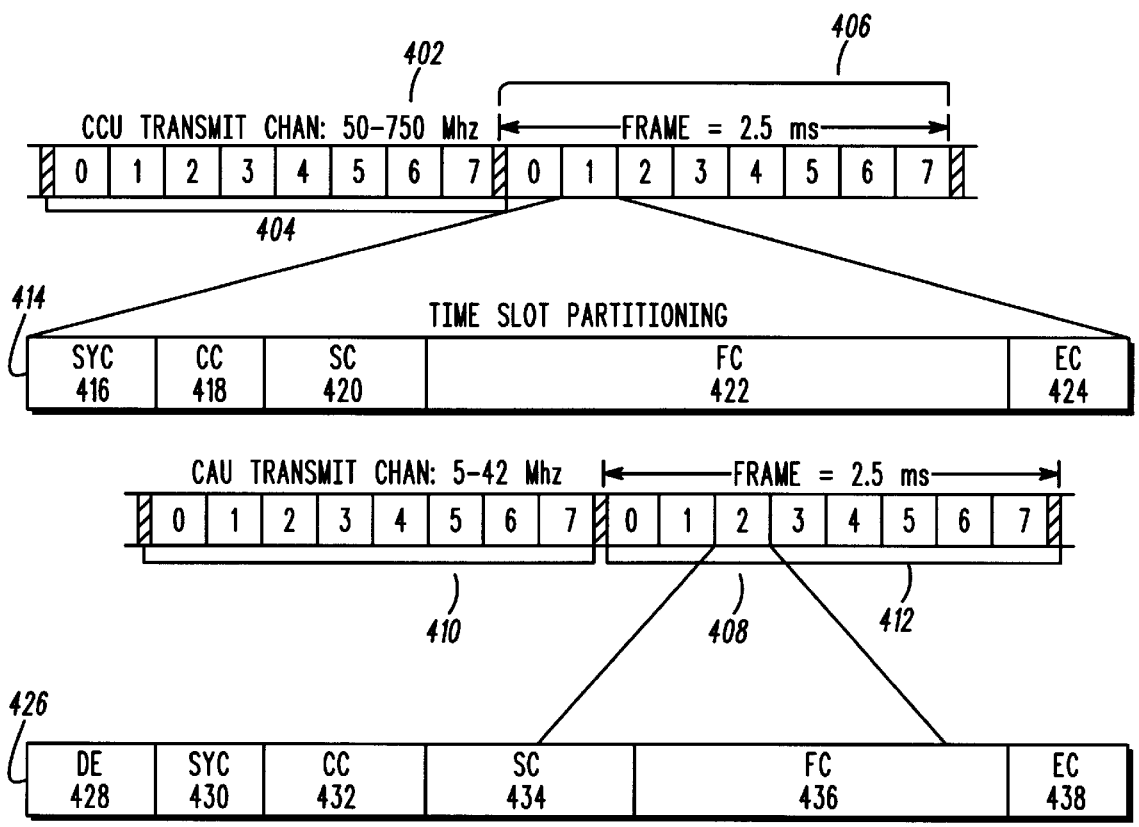
FIG. 4B is an illustration of a CCU channel and a CAU channel.

In addition, communications system 100 provides for time division multiplexing in which a number of channels are derived from the transmission medium by dividing the access to the medium into sequential "time slots". As can be seen with reference to FIG. 4A, superframe 400 includes 8 frames with each frame having 8 time slots. Turning next to FIG. 4B, CCU channel 402 includes frames 404 and 406 while CAU channel 408 includes frames 410 and 412. Each frame has a length of 2.5 milliseconds, which are divided into 8 time slots, forming 8 digitally encoded time division multiplexed (TDM) information bearing channels.

Each time slot is further partitioned for different types of signaling by communications units. For example, downlink burst 414 in time slot 1 in frame 406 includes a synchronization channel (SYC) 416, a control channel (CC) 418, a slow channel (SC) 420, a fast channel (FC) channel 422, and an error control channel (EC) 424. SYC 416 is a synchronization channel used for frame synchronization. CC 418 is used to indicate word errors, signaling, and power control.

SC 420 is used for signaling, and FC 422 is used for both user data and signaling. EC 424 is used for error detection.

Uplink burst 426 in time slot 2 in frame 412 includes differential encoder bits (DE) 428, synchronization channel (SYC) 430, CC 432, SC 434, FC 436, and EC 438. SYC 416 in downlink burst 414 contains 25 bits, while SYC 430 in uplink burst 426 contains 14 bits. CC 418 in downlink burst 414 includes 9 bits while CC 432 in uplink burst 426 contains 2 bits. Both SC 420 and SC 434 contain 26 bits. Downlink burst 414 contains a total of 240 bits and is 312.5 microseconds long, while uplink burst 426 contains 224 bits and is 291.67 microseconds long. In both uplink burst 426 and downlink burst 414, the SC includes 26 bits, the FC includes 160 bits, and the EC contains 20 bits.

CCU channel 402 is a downlink channel transmitted in a frequency range from 50 MHz to 750 MHz while CAU channel 408 is an uplink channel transmitted in a range from 5 MHz to 42 MHz according to the present invention. A data transmission within these channels is sent as a "burst", which is a fixed length transmission of data, such as a transmission of a group of bits. In the depicted example, a burst is 224 bits per time slot in CAU channel 408 and 240 bits per time slot in CCU channel 402.

With reference now to FIG. 4C, a diagram of a burst in a downlink control channel from a CCU to a CAU is depicted according to the present invention. Downlink burst 440 includes a superframe number in bits 1 through 3, indicating which one of the 8 sequential frames constitutes a superframe. Frames are marked cyclically from 0 ("000") to 7 ("111") in bits 1 through 3. The value identifies a frame's position within the sperframe and is called the frame number. As can be seen, the least significant bit of the frame is transmitted first. Bits 4 through 6 of the control channel mark time slots within a given frame. These time slots are marked sequentially from 0 ("000") to 7 ("111"). The least significant bit is transmitted first. Bit number 7 is reserved for some later use according to the present invention. Bit number 8 is the word error indicator and is set as a "1" when an error has occurred and a "0" when no error has occurred. Bit number 9 in downlink burst 440 is the fast channel indicator, which indicates whether the fast channel contains signaling information or user information.

Each time slot in both the uplink and downlink transmissions is used for various types of channels such as a system broadcast channel (SBC), a system access channel (SAC), or a traffic channel (TCH). The SBC and SAC are system channels. SBCs broadcast system information in downlink transmissions to all CAUs monitoring the SBCs. A CAU locates the SBC and listens to the SBC for information of general interest to all devices attached to a CAU. According to the present invention, the SBC identifies general system identifiers and capabilities; security information used for authentication and encipherment; and location of channel frequencies, SBCs, and SACs. Multiple SBCs are used to provide redundancy in communications system.

Communications system 100 is accessed by a CAU using the SAC. As a result, a CAU is assigned a TCH with which to perform signaling protocols. When a CAU is registered, it will reacquire the SBC and listen for notification of incoming calls.

The SAC is a physical channel employed to gain access to the communications system and obtain a TCH or reconnect to a TCH. Multiple SACs are used to provide both redundancy and to reduce contention between multiple CAUs requesting access to communications system 100. TCHs provide user services on communications system 100 and may be requested and assigned for varying rates of data transmission. TCHs are either busy (in use) or idle (not in use).

Communications system 100 includes mechanisms to deal with the interference present in distribution network 106 in FIG. 1. The onset of interference at a particular frequency may be sudden, and possibly catastrophic, rendering the channel totally unusable. A mechanism in communications system 100 is provided for detecting the onset of interference and switching to another channel to avoid the interference. The process of switching from one channel to another channel is referred to as an alternate link transfer (ALT). Additionally, communications system 100 also includes a process for assigning traffic channels to various CAUs based on the quality of channels within communications system 100.

Quality Metrics

Quality metrics are used to measure channel quality and to assign channels and to trigger ALTs. Word errors, signal to noise ratio (SNR), and attenuation relative to power level (ARPL) values are quality metrics detected and measured according to the present invention. SNR, word errors, and ARPL values are measured on busy uplink channels, and word errors are measured on busy downlink channels. Busy downlink quality defects are indicated by the report of a word error in a corresponding uplink channel. Attenuation relative to power level values are measured on idle uplink channels according to the present invention. These quality metrics are used to determine when to perform an ALT. Quality metrics are also used to determine channel quality and to rank channels in the communications system. The channel rankings are used to assign channels based on the quality required by a CAU requesting a channel.

A quality metric outside of an acceptable range is a quality defect and is used to recognize the onset of an impending burst of interference and to trigger an ALT to avoid the interference. A quality defect is also called a "quality metric defect" (QM-D). This switching of channels, however, results in temporary quality degradation. As a result, the number of ALTs that are performed should be minimized. Furthermore, once an ALT is performed, a certain amount of time must pass before another ALT can be performed. As a result, the initial assignment of channels and the selection of channels as the target of ALTs should be performed to minimize the probability of an ALT occurring.

A quality metric ranking (QM-R) value is a value that provides a historic measure (decaying average) of a channel's quality, which is then used to discriminate between available channels when selecting a channel for assignment or as the target of an ALT.

The present invention associates a QM-R value with every channel in communications system 100. The quality metrics are typically collected by DSPs in CPXs 112 and forwarded to controller 114. This data is used as criteria to select a traffic channel for assignment.

Word Errors

With respect to detecting an occurrence of word errors, every TDMA frame contains an error channel and a word error indicator (WEI). The error channel contains a cyclic redundancy check (CRC). The WEI bit is set by the CAU or CPX to signal that an error was detected in a previous burst by a failed CRC.

Downlink word errors are determined when a CAU receives a burst in a given frame of the downlink. The CAU formulates the correct value of the WEI bit and incorporates it into the uplink burst that is sent in a corresponding time slot and frame within the next superframe. Uplink word errors are determined when a CPX receives a burst in a given frame of the uplink, where upon the CPX checks the CRC to determine if a word error has occurred. If a word error is detected, the WEI is set.

Attenuation Relative to Power Level

CPXs in a CCU measure the received signal strength in every time slot, active or idle. This received signal strength indicator (RSSI) measures the signal power and is calibrated to provide the number of decibels of signal attenuation relative to the maximum linear input of the receiver, before signal clipping. This calibrated value is called the attenuation relative to power level (ARPL) value. An ARPL reading of 0 dB indicates that the received power level of the transmitted CAU burst is at the maximum level. Any increase in CAU power would result in a distorted signal being received. A reading of 6 dB indicates that the received burst power is 6 dB below the maximum level. The ARPL has a dynamic range of 40 dB in the depicted example.

With respect to ARPL quality metrics, although ARPL measurements are made on bursts received on TCHs, ARPL quality metrics also are gathered on idle uplink TCHs. The measurement of ARPL on idle uplink channels is a useful feature to the management of channels in the presence of interference. In particular, ingress noise is a much more significant problem in the upstream than downstream channels (when interference occurs on a channel, an ALT will be performed, moving the channel to an idle state). If idle channels cannot be ranked, then it is impossible to make an intelligent selection of a channel for assignment or as the target of an ALT. ARPLs are power attenuation levels received at a CCU. ARPL measurements on idle TCHs of an uplink channel are used to detect the onset of interference according to the present invention.

With reference now to FIG. 5, a flowchart of a process for obtaining a power attenuation level from a signal received at a CCU is depicted according to the present invention. This process also may be used to measure idle channels by measuring the signal strength of time slots even though no burst or signal is received at the CCU from a CAU. A similar process also may be used to measure power attenuation levels at the CAU to obtain ARPL values for busy downlink channels. The process begins by receiving a complex digital signal from A/D converters (step 500). Thereafter, symbol timing is recovered (step 502) and the vector magnitude of the complex signal is calculated (step 504). The vector magnitude is calculated using an approximation to:

$$|VEC| = \sqrt{I^2 + Q^2}$$

where the approximation is $|VEC|=0.3364 * \text{MIN}(|I|,|Q|)+ \text{MAX}(|I|,|Q|)$. The average vector magnitude, which is a linear 7-bit value, is converted to a logarithmic number using a lookup table procedure (step 506). The logarithmic number is scaled to represent the amount of attenuation in decibels relative to the maximum input of the A/D converter before clipping (step 508) with the process terminating thereafter. The scaled logarithmic number representing the amount of attenuation in decibels determined in step 508 is the ARPL. More information on detecting and measuring power attenuation levels may be found in co-pending U.S. patent application by Burke, Timothy M. et. al., entitled Method and Apparatus for Adaptive RF Power Control of Cable Access Units, filed Oct. 27, 1995, which is incorporated by reference herein. According to the present invention, +23 dB is the idle traffic interference threshold.

Specifically, an ARPL measurement of 0 dB is a strong indication of interference, while +23 dB is an indication of little or no interference.

Signal to Noise Ratio

With respect to SNR quality metrics, the determination of SNR utilizes received signal strength measurements, such as ARPL measurements in FIG. 5, which are collected on busy and idle time slots of an active uplink channel by the DSPs on the CPX assigned to an active channel frequency.

On an active time slot, the ARPL indicator actually measures signal plus noise power. Under normal operating conditions, however, the signal power is much greater than the noise power and the noise contribution may be ignored. On an idle time slot the ARPL indicator measures only noise power. The SNR quality metric is determined by the difference between the noise power reading of an idle channel (ARPLidle) and the signal plus noise power reading of an active channel (ARPLactive):

$$SNR\text{dB}=ARPL\text{idle}-ARPL\text{active}$$

The ARPL of an active time slot is the ARPL reading of the currently assigned TCH time slot. The ARPL of an idle time slot is the ARPL reading from the most recent idle time slot on the same frequency as the active TCH. The ARPLidle parameter is a variable unique to each CPX receiver which is initialized (maximum attenuation level or 40 dB) on each new upstream frequency assignment and updated and maintained for the duration of the call, i.e. until the upstream frequency is released. Whenever an idle time slot occurs on that frequency, the ARPLidle parameter is updated with the new ARPL reading, This parameter is global to all active time slots on that assigned frequency and is used in the calculation of the SNR.

For example, assume that a particular CPX is assigned a new frequency F1 with an associated uplink channel and that a single CAU is assigned to time slot 7 of that channel. In this case, time slots 0 through 6 are idle. After returning the CPX to F1, the ARPLidle parameter is initialized to 40 dB. Also assume that the ARPL reading in all of the idle time slots is 24 dB, meaning that the noise power level is 24 dB below the maximum input of the receiver. When time slot 0 is received, the ARPLidle parameter will become 24 dB. Likewise for time slots 2 through 6, the parameter is updated. Finally, when time slot 7 is received and an ARPL level of 5 dB is reported, the SNR for time slot 7 is computed with a result of 19 dB (24 dB–5 dB).

This technique of estimating SNR is dependent upon the traffic density of an assigned channel, in particular, the case where all time slots are in use. However, in this situation, other channel quality metrics, such as burst CRC errors, may be used in determining link transfers.

Error Records

A record is used for each frame to determine if a defect has occurred during a frame interval of a channel. A record of the four most recent quality defects are maintained for each uplink and downlink channel assigned to a CPX. This record includes an entry for each time slot, which contains an indication of whether a quality defect has occurred.

The CCU counts the number of errored frames that occur within a 4,800 frame window (a 12 second period). If 2 consecutive frames or 4 or more cumulative frames are in error in the 4800 frame window, a link transfer is performed to move to a new channel with less noise. Although the depicted example uses a 4,800 frame window and initiates an ALT upon four or more frames being in error, other frame sizes may be used and other numbers of frame errors may be employed to initiate an ALT.

Quality Defect Intervals

The quality defect interval (QD-I) is the interval between the occurrence of quality defects. The quality metric ranking value is a historic average of the QD-I. A historic measure of channel quality is calculated using a decaying average as follows:

$$QM\text{-}R = \text{old } QD\text{-}I * (1\text{-Decay Rate}) + \text{new } QD\text{-}I * \text{Decay Rate}.$$

The decay rate is a number between 0.0 and 1.0. If decay rate is 0.8, the calculation is as follows:

$$QM\text{-}R = \text{old } QM\text{-}R. * 0.2 + \text{new } QD\text{-}I * 0.8$$

A higher decay rate results in a QM-R measurement that is more sensitive to the current QD-I and responds more quickly to changes in channel quality. A lower decay rate results in a more stable QM-R measurement that is less sensitive to the current QD-I and more sensitive to the historic QM-R measures.

Channel Quality Classes

A set of channel qualities, called "channel quality classes", are supported from which a subscriber may select a desired channel quality class. Each set is based upon the type of data transmission or service provided in the communication system. Different types of data transmissions may be more or less sensitive to channel quality. A subscriber may be a person making the selection, a CAU, or a computer program executing on a data processing system that is connected to communications system 100.

Each channel quality class is defined by high and low QM-R value which defines the range of QM-R values for the class. The number of channel quality classes supported and the QM-R values, which define each of the channel quality classes, depends upon the particular communications system and the particular implementation.

Turning to FIG. 6A, a diagram of channel quality classes is depicted according to the present invention. Table 600 contains four classes, 1 through 4. Each class in table 600 contains QM-R values, also called "quality values", in the range of 0 to 9, with 0 indicating the lowest quality channel and 9 indicating the highest quality channel. Each subscriber is able to select the channel quality classes to which it will subscribe. Each class includes an high quality value and low quality value. Each request from a CAU, contains one channel quality class based on the particular type of service requested. The high quality value specifies the optimal channel quality requested by the subscriber. The low quality value specifies the minimal channel quality required by the subscriber. Of course those of ordinary skill in the art will realize that other class numbers or values may be used according to the present invention.

Channel quality classes may be entered for each subscriber through an interface at the headend or created at the time of the initial creation of the subscriber record according to the present invention. These values are typically sent to the CCU, where they are stored in a database for use in assigning traffic channels in the depicted example. Of course, those of ordinary skill in the art will realize that channel quality classes may be provided to a subscriber through other means other than through the CCU.

Whenever a CAU registers with communications system 100, the channel quality classes for the associated subscriber are retrieved from the database and downloaded to the CAU. Registration is a process in which the CAU lets communications system 100 know that the CAU is on the system. The registration process involves an exchange of information between the CAU and the CCU, which includes channel quality classes. These values are then included by the CAU in every channel request. Each request from a CAU includes a channel quality class, which specifies an high quality value and a low quality value.

Controller 114 in CCU 102 performs traffic channel management. Controller 114 maintains a list of traffic channels available for use and associates traffic channels into sets based upon the QM-R of the associated channel. A quality class table is used by controller 114 to perform traffic channel management.

Turning now to FIG. 6B, a diagram of TCH ranking in a quality class table is depicted according to the present invention. With reference to quality class table 602, this quality class table is used to perform traffic channel management according to the present invention. Quality class table 602 includes an entry for each quality class supported by communications system 100. Each quality class table entry includes a list of channel records whose QM-R values are within the ranges defining the channel quality classes, as illustrated in FIG. 6A. In the depicted example, quality class table 602 includes channel quality classes 1–4. Quality class table 602 includes channel record lists 604–618. Each of these channel records contain current QM-R value for the channel along with the busy-idle status of each channel. Each time a new QM-R value is calculated for a channel, the channel record will be reassigned to possibly a different quality class within the quality class table.

With reference to FIG. 6C, a depiction of how channel records assignments can be changed in response to receiving a new QM-R report is depicted according to the present invention. Records 606, 608, and 614, in quality class table 602, have been reassigned to different classes in response to new values received in a QM-R report by the CCU. A diagram of a channel record is depicted according to the present invention in FIG. 6D. Channel record 650 includes a QM-R value in entry 652. Available bandwidth is indicated in entry 654. Entries 656–670 include entries for time slots 0–7 that indicate whether a particular time slot is idle or busy. Entries 656–670 also may indicate whether a quality defect has occurred for the corresponding time slot.

When a request for a TCH is received, it is satisfied by an idle TCH on a channel corresponding to the high quality requirements specified in the channel request. If the class is empty or no idle TCHs are available on a channel in this class, a search is made for an idle TCH. The search examines the channel record list of successively lower quality classes. The search terminates when a channel is found or all the quality classes whose quality exceeds the low channel quality requirements specified in the channel request have been searched. Only if all the classes between the high and low channel quality requirements are empty will a "better" channel than the high quality channel requirement be allocated. If no TCH is available which meets the low quality service requirement, the channel request will be denied because of an unavailability of resources of the specified quality. When this condition occurs, the subscriber has the option of using a lower quality channel if one is available. Once a channel has been selected for allocation as a TCH, it is marked as busy in the corresponding channel record, such as channel record 650 in FIG. 6D. When a previously allocated channel is released the channel record corresponding to the channel is marked as idle.

With reference again to quality class table 602 in FIG. 6C, when a channel request is received with a high channel class of 3 and a low channel class of 4, a TCH of class 3 is assigned because one is available. A channel request having a high channel class of 1 and a low channel class of 2 results in a TCH 1 being assigned. Receiving a request with a high channel class of 2 and a low channel class of 2 will normally result in a TCH of class 2 being assigned if one is available. In the depicted example, no channel is available. According to the preferred routine, then, a channel from the next higher class available, i.e. class 1, is assigned. A channel request with a high channel class of 2 and a low channel class of 3 results in a TCH of class 3 being assigned. A more detailed description of the processes for managing TCHs is found below.

Processes for Managing Traffic Channels

Figure 7:
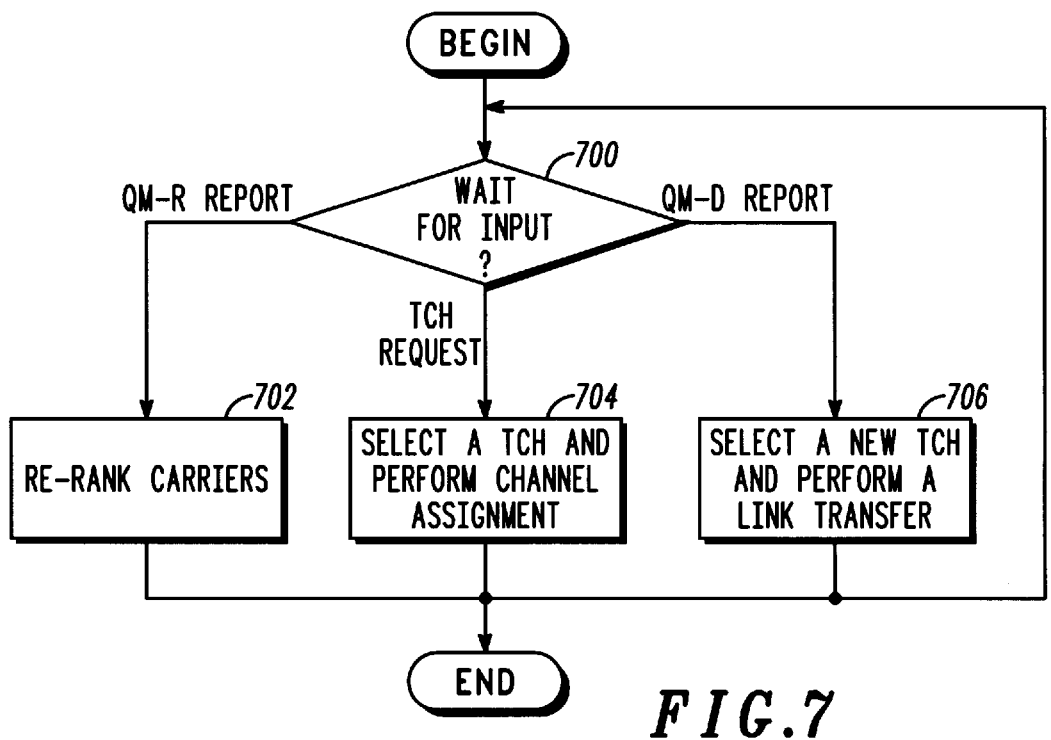
FIG. 7 is a high level flowchart of a process for managing TCHs in a communications system, such as communications system 100 in FIG. 1.

The following is a description of the processes followed by the present invention to manage traffic channels through the initiation of ALTs and channel assignments using quality metrics as described below. With reference first to FIG. 7, a high level flowchart of a process for managing TCHs in a communications system (such as communications system 100 in FIG. 1) is depicted according to the present invention. The flowchart depicts the process followed by a processor in controller 114 in FIG. 1. Controller 114 waits for and handles various reports and requests from CPXs. A quality metric ranking (QM-R) value is used to rank channels. The QM-R is based on ARPL quality, SNR values, and WEI. A QM-R value is periodically calculated in the CCU for a downlink and uplink channel by a busy CPX (a CPX with at least one busy TCH). Next, when a channel is assigned to the CPX, the old QM-R will be provided to the CPX. Quality metric defects (QM-Ds) are used to trigger an ALT due to interference. QM-Ds are detected using the occurrence of word errors in a data transmission during a selected period of time, measuring ARPL levels, or determining SNR levels. CPXs 112 receive various uplink data transmissions, including requests for TCHs, which are sent to controller 114 for processing as illustrated in FIG. 1. CPXs 112 also generate quality metric reports that are sent to controller 1 14.

The process begins by waiting for input from a CPX, such as CPXs 112 in FIG. 1 (step 700). Upon receiving a quality ranking metric (QM-R) report, the channels are reranked (step 702) with the process terminating thereafter. Upon receiving a TCH request from a CPX, a TCH is selected and channel assignment is performed (step 704) with the process terminating thereafter. In response to receiving a quality metric defect (QM-D) trigger report from a CPX, a new TCH is selected and an ALT is performed (step 706) with the process terminating thereafter.

Figure 8:
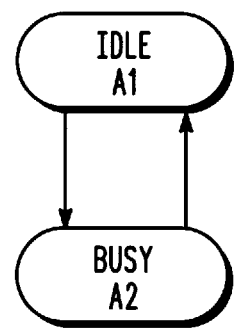
FIG. 8 is a state diagram of a CPX.

With reference now to FIG. 8, a state diagram of a CPX is depicted according to the present invention. In Idle State A1, the CPX scans all frequencies in the serving area and collects QM-R values. In Busy State A2, the CPX collects QM-R values on the assigned channel and detects and reports when the QM-D triggers an ALT. A CPX will transition from Idle State A1 to Busy State A2 when the CCU assigns a TCH to the channel associated with the particular CPX. If all of the calls on a CPX end and the CPX does not contain any system channels, the CPX will then transition from Busy State A2 back to Idle State A1. CPXs that have system channels, such as SBCs and SACs, are never in Idle State A1.

Figure 9:
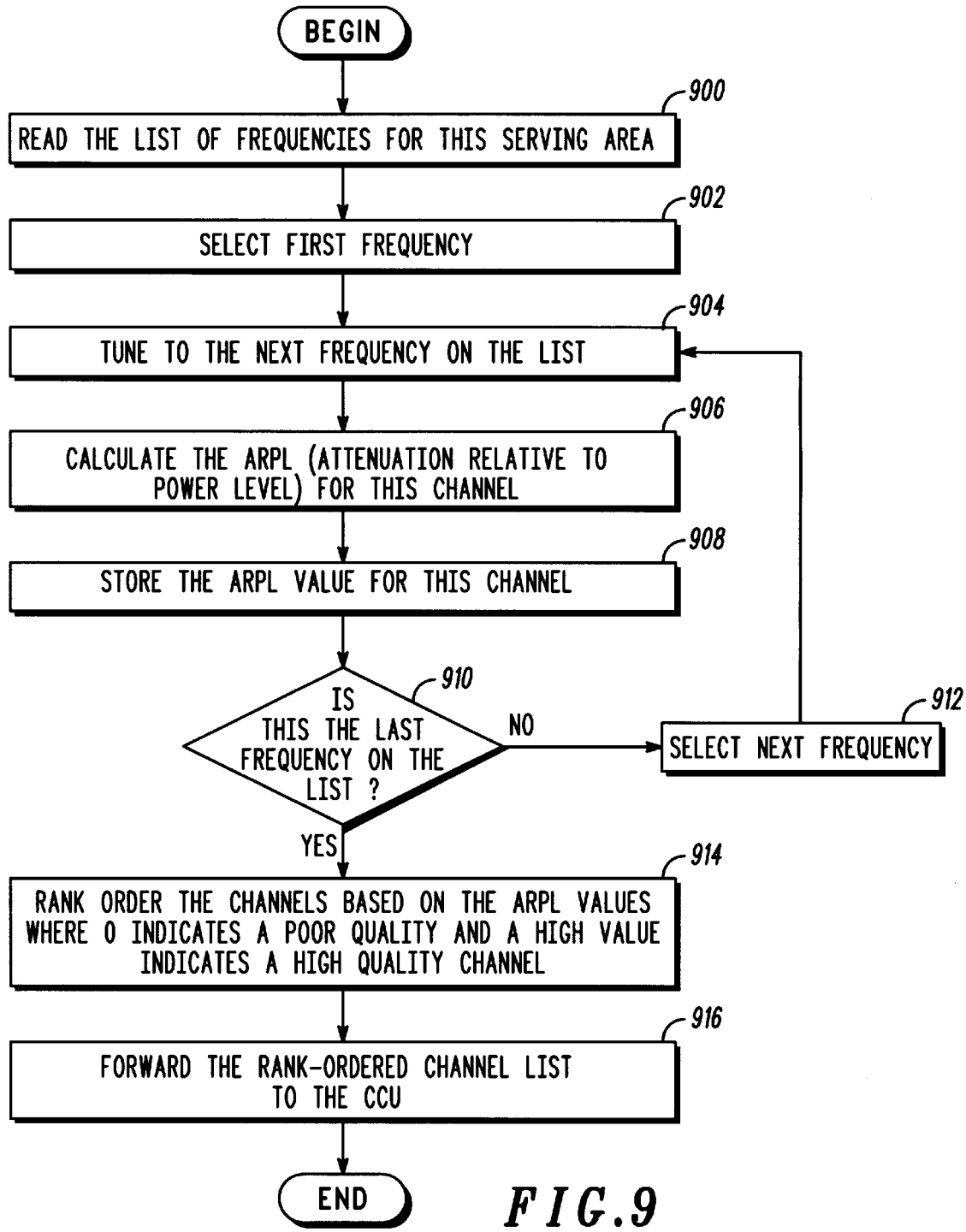
FIG. 9 is a flowchart of idle CPX processing.

With reference now to FIG. 9, a flowchart of idle CPX processing is depicted according to the present invention. Idle CPX processing is used to determine attenuation relative to power levels (ARPLs), which are used in ranking candidate channels for TCH assignments. The CPX reads the list of frequencies for RF channels in the serving area (step 900). The first frequency in the list is selected (step 902). Thereafter, the CPX tunes to the selected frequency on the list (step 904). An ARPL is calculated for the channel that has been tuned to by the CPX (step 906). The ARPL value is stored for the channel (step 908) and a determination is then made as to whether the frequency is the last frequency on the list (step 910). If the frequency is not the last frequency, the process selects the next frequency on the list (step 912) and returns to step 904.

Otherwise, the channels are ranked based on ARPL values (QM-R values in the depicted example) where a zero indicates a poor quality channel and a high value indicates a high quality channel (step 914). Thereafter, the rank ordered channel list is forwarded to the CCU (step 916) with the process terminating thereafter.

Figure 10:
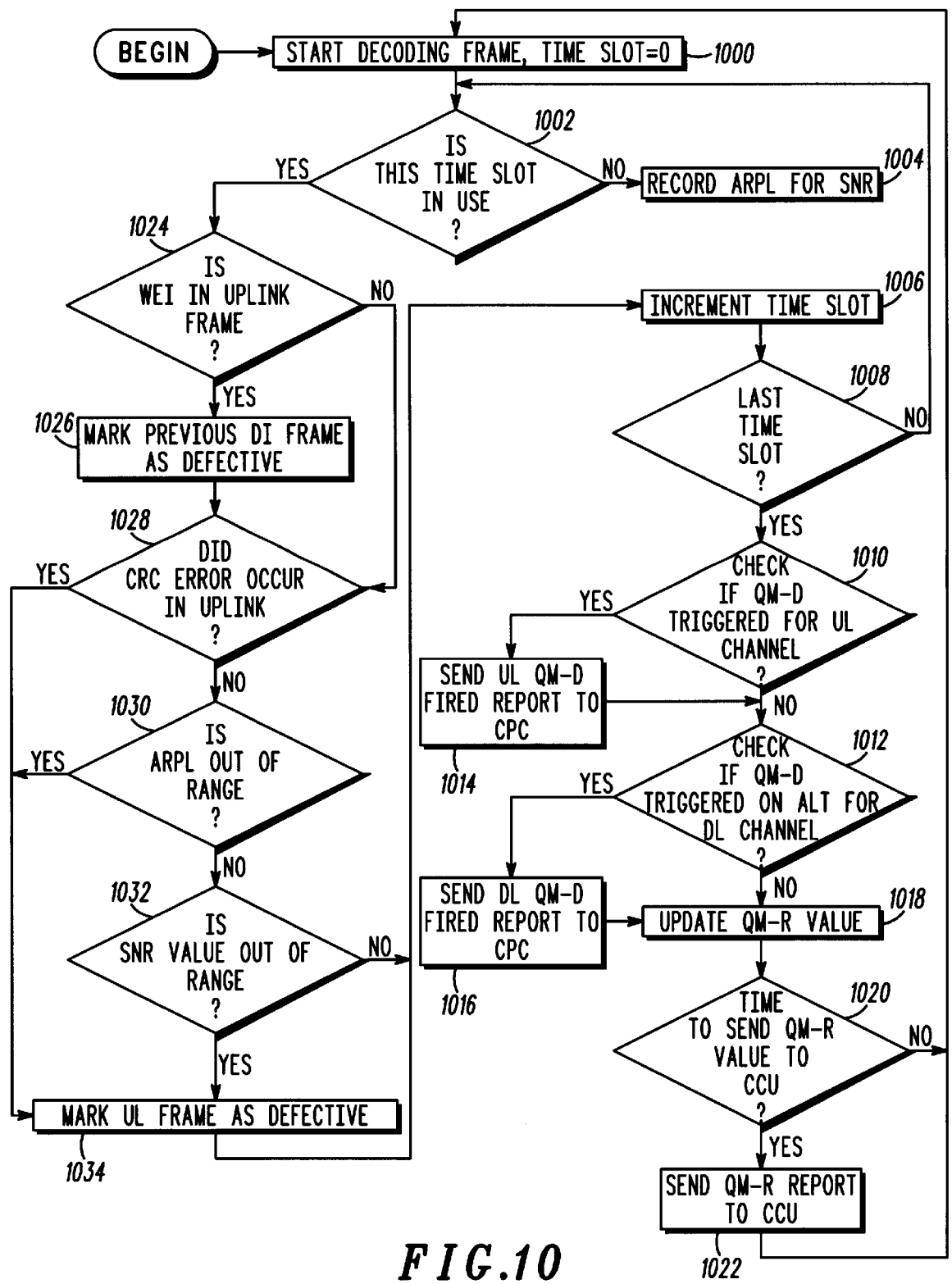
FIG. 10 is a flowchart of busy CPX processing.

Turning next to FIG. 10, a flowchart of busy CPX processing is illustrated according to the present invention. Busy CPX processing is employed to determine the presence of word errors and SNR and ARPL values on uplink channels and word errors on downlink channels. These values are used to determine whether an ALT should occur and to rank channels for assigning TCHs. The process begins by the CCU starting to decode the frame, beginning with time slot zero (step 1000). A determination is made as to whether the time slot is being used (step 1002). If the time slot is not being used, the process records an ARPL value for use in determining SNR values (step 1004).

Thereafter, the process increments the time slot by one (step 1006). A determination is made as to whether this time slot is the last time slot (step 1008). If the incremented time slot is not the last time slot, the process returns to step 1002 as described above. Upon reaching the last time slot, the process then checks to see if a QM-D has triggered an indication that an ALT is needed for the uplink (UL) channel (step 1010). In the depicted example, a QM-D triggers an indication that an ALT is needed for an uplink channel when two consecutive QM-Ds are detected or four QM-Ds occur within a selected period of time for an uplink channel. If the determination is no, the process then checks to see if a QM-D has triggered an indication that an ALT is needed for the downlink (DL) channel (step 1012). A QM-D triggers an indication that an ALT is needed for a downlink channel when two consecutive QM-Ds occur or when four QM-Ds in a frame occur within a selected period of time for the downlink channel. When an indication that an ALT is needed is triggered by a QM-D, a QM-D trigger report is sent to the CCU to indicate that an ALT should be performed. With reference again to step 1010, if QM-D has triggered an ALT for the uplink channel, the process then sends a UL QM-D trigger report to the CCU (step 1014) with the process then proceeding to step 1012 as previously described.

Returning to step 1012, if QM-D has triggered an indication that an ALT is needed for the DL channel, the process sends a DL QM-D trigger report to the CCU step 1016 and then updates the QM-R value (step 1018). The process proceeds directly to step 1018 from step 1012 if a QM-D triggering an indication that an ALT is needed has not occurred. From step 1018, the process determines whether it is time to send the QM-R value to the CCU (step 1020). If it is not time to send the QM-R value to the CCU, the process returns to step 1000. Otherwise, the process sends the QM-R report to the CCU for UL and DL channels (step 1022) prior to returning to step 1000.

With reference again to step 1002, if the time slot is in use, the process then determines whether the word error indicator (WEI) has been set in the uplink frame (step 1024). If the WEI has been set, the process marks the previous downlink frame as being defective (step 1026).

Thereafter, a determination is made as to whether a CRC error has occurred in the uplink frame (step 1028). The process proceeds directly from step 1024 to step 1028 if the WEI is not set in the uplink frame. Upon a determination that a CRC error has not occurred in the uplink, the process determines whether the ARPL is out of range (step 1030). If the ARPL is not out of range, a determination is made as to whether the SNR value is out of range (step 1032). If the SNR value is not out of range, the process proceeds to step 1006 as described above.

If the SNR value is out of range, the uplink frame is marked as defective (step 1034). The process also proceeds directly to step 1034 from step 1028 if a CRC error occurred in the uplink. Additionally, the process proceeds to step 1034 and marks the frame as defective if the ARPL is out of range in step 1030. In the depicted example, a frame is marked as defective when a single time slot contains a WEI that has been sent to indicate an error in the time slot. Frames also may be marked as defective after two or more time slots in a frame have been indicated as defective. This type of marking occurs when a channel has two or more active time slots according to a preferred embodiment of the present invention.

Traffic channels are assigned using candidate channels that have been ranked by quality and by the bandwidth available within each channel. The quality ranking of candidate channels may be based on ARPL values and ranked as described above in FIG. 9. Furthermore, other values or other combinations of values in addition to ARPL values may be used to rank channels. For example, the number of word errors occurring within a time period and the SNR values also may be used in ranking channel quality.

Figure 11:
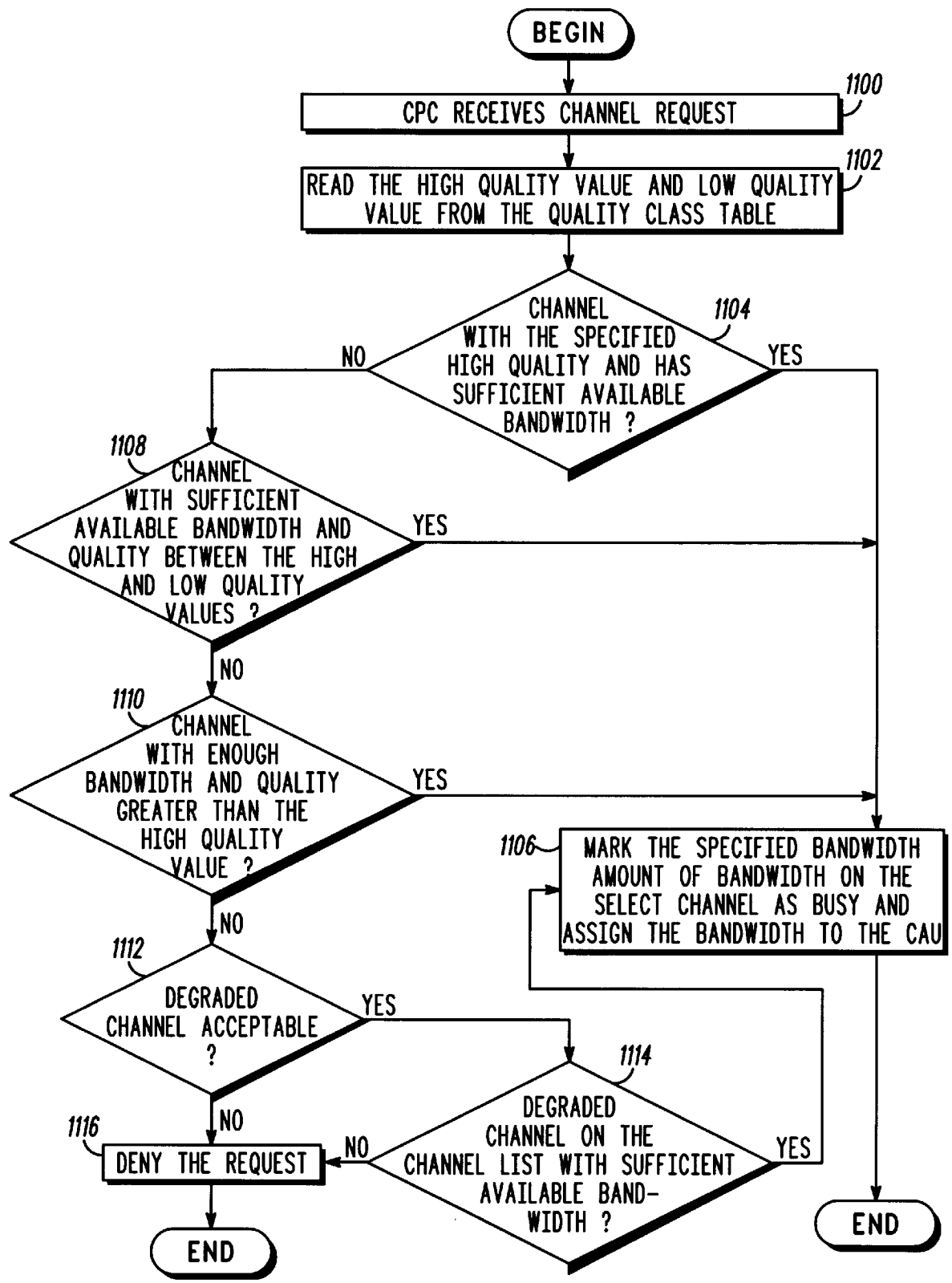
FIG. 11 is a flowchart of a process for assigning traffic channels.

With reference now to FIG. 11, a flowchart of a process for assigning traffic channels is depicted according to the present invention. This flowchart illustrates the process performed by a CCU when it receives a channel request and selects a channel for assignment. This process is dependent upon the channel class subscription that the CAU has specified. As mentioned before, the channel quality class defines the quality of the channel required by the CAU. For example, certain services, such as video phones, are more sensitive to channel quality than other services, such as voice and, therefore, require a higher quality channel.

The channel quality class includes a high quality value and a low quality value. The high quality value is the value the subscriber would like to receive. This value represents the channel quality at which optimal performance is achieved as perceived by the user of the channel. Use of channel with a higher quality than this, however, will not result in the perception of better quality to the user of the channel. A low quality value represents the minimum channel quality the user will accept. Use of a channel with a quality below what is represented by this value will result in a degradation of quality, as perceived by the user, that is unacceptable. The use of channel with a quality between these two values results in a quality, as perceived by the user, that is within the normal accepted range. For example, the voice quality may not be "high fidelity", but is comparable to what is generally provided by a telephony system and with which the user is satisfied.

The quality classes that are supported by the system would be generally be defined by the service providers according to the types of services they intent to provide. The subscriber would then be allowed to choose a quality class based upon the type of service it is receiving without knowing what the underlying channel qualities are. For example, a subscriber would simply select a quality class for video telephony or voice telephony, not a quality class with a bit error rate (BER) of $10^{-6}$.

The process begins by the CCU receiving a TCH request specifying a channel quality class, degraded channel acceptability, and bandwidth requirement (step 1100). The band width requirement indicates how many TDMA time slots a subscriber needs simultaneously (at the quality requested) for the type of communications intended (e.g. video phone needs more time slots than audio only), The high quality value and the low quality value are obtained from the quality class table (step 1102). The quality class table is a table specifying a high quality value and a low quality value, such as table 600 in FIG. 6A. Alternatively, the high quality value and the low quality value may be sent directly to the CCU. A determination is then made as to whether channels are present on the list with specified high quality that has sufficient bandwidth (step 1104). If a channel is present meeting the specified high quality value having sufficient bandwidth, the process marks the specified bandwidth amount of the bandwidth on the selected channel as busy and assigns this bandwidth to the CAU (step 1106) with the process terminating thereafter.

With reference again to step 1104, if a channel is not present on the list that has the specified high quality with sufficient bandwidth, a determination is then made to whether a channel on the list has sufficient bandwidth and a quality between the high and low quality values of the quality class (step 1108). If two or more channels are found in a range defined by the high and low quality values, the higher quality channel is selected. If this determination is yes, the process then proceeds to step 1106 as previously described. With reference again to step 1108, if a channel having sufficient bandwidth and a quality within the range defined by the high and low quality values of the quality class is absent, a determination is made as to whether a channel, having sufficient bandwidth available and whose quality is higher than the high quality value of the quality class, is available (step 1110). If a higher quality channel is available, the process then proceeds to assign the bandwidth to the CAU, as described in step 1106 above. Otherwise, the process makes a determination as to whether a degraded channel is acceptable (step 1112).

When the channel selection algorithm is unable to find a channel with a quality that is at least as high as that specified by the low quality value, some subscribers may not accept a channel that does not at least meet the minimum specified quality while others may prefer to receive degraded service over no service at all. In addition to the quality class, the channel request specifies whether a degraded channel will be acceptable. If a degraded channel is acceptable, the process then determines whether a degraded channel is present on the channel list that has sufficient bandwidth (step 1114). If such a degraded channel is present, the process then proceeds to assign the bandwidth to the CAU as described in step 1106. Otherwise, the CCU denies the request (step 1116) with the process terminating thereafter. With reference again to step 1112, if a degraded channel is not acceptable, the process also proceeds to step 1116 to deny the request.

Several variations of assigning channels exist, which may be employed according to the present invention. Preferably, the subscriber selects a channel quality class based on the current call. Based upon the interface that originates the connection the channel quality class is determined. The interface is a device connected to the CAU. For example, an interface may be a telephone or a video conferencing system. Each time the subscriber makes a call the subscriber determines what quality it requires and includes that information in the call request. The quality required will change from call to call based upon the type of service being provided. For example, the CAU will have a standard telephony interface to the phone in the home and separate interfaces for ISDN lines or to a video phone.

Alternatively, the subscriber selection of channel quality class is static. The subscriber is informed of its channel quality class when it registers. This is the class the subscriber will use. With a CAU that only supports telephony services, the CAU may be used to provide either standard telephony services, facsimile services, or combinations of service types. For a home business with two phone lines, one a dedicated facsimile line and another that is a standard phone line, each line would be assigned the same quality class.

Figure 12:
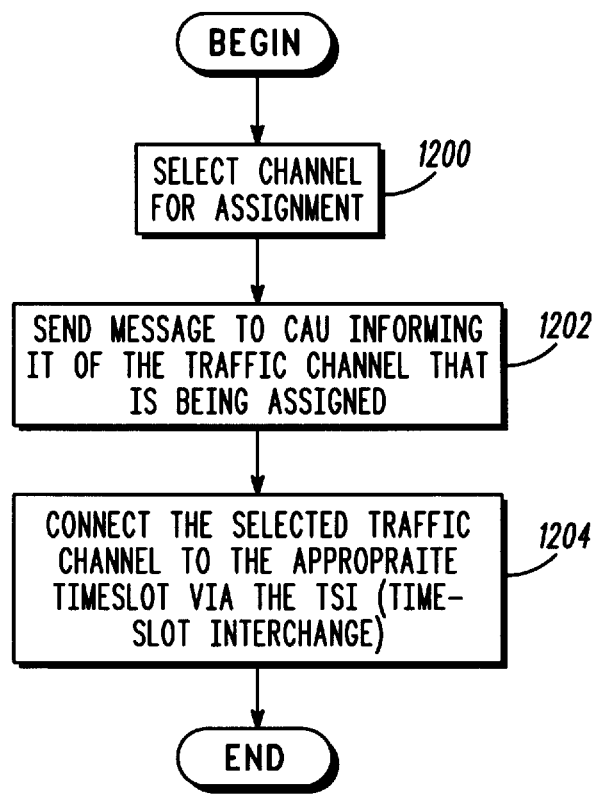
FIG. 12 is a flowchart of a process for assigning a channel to a CAU.

With reference now to FIG. 12, a flowchart of a process for assigning a channel to a CAU is depicted according to the present invention. The process begins by selecting a TCH for assignment (step 1200). Thereafter, the process sends a message to the CAU informing it of the TCH that is being assigned (step 1202) and the selected channel is connected to the appropriate network time slot using the time slot interchange (TSI) (step 1204) with the process terminating thereafter.

Figure 13:
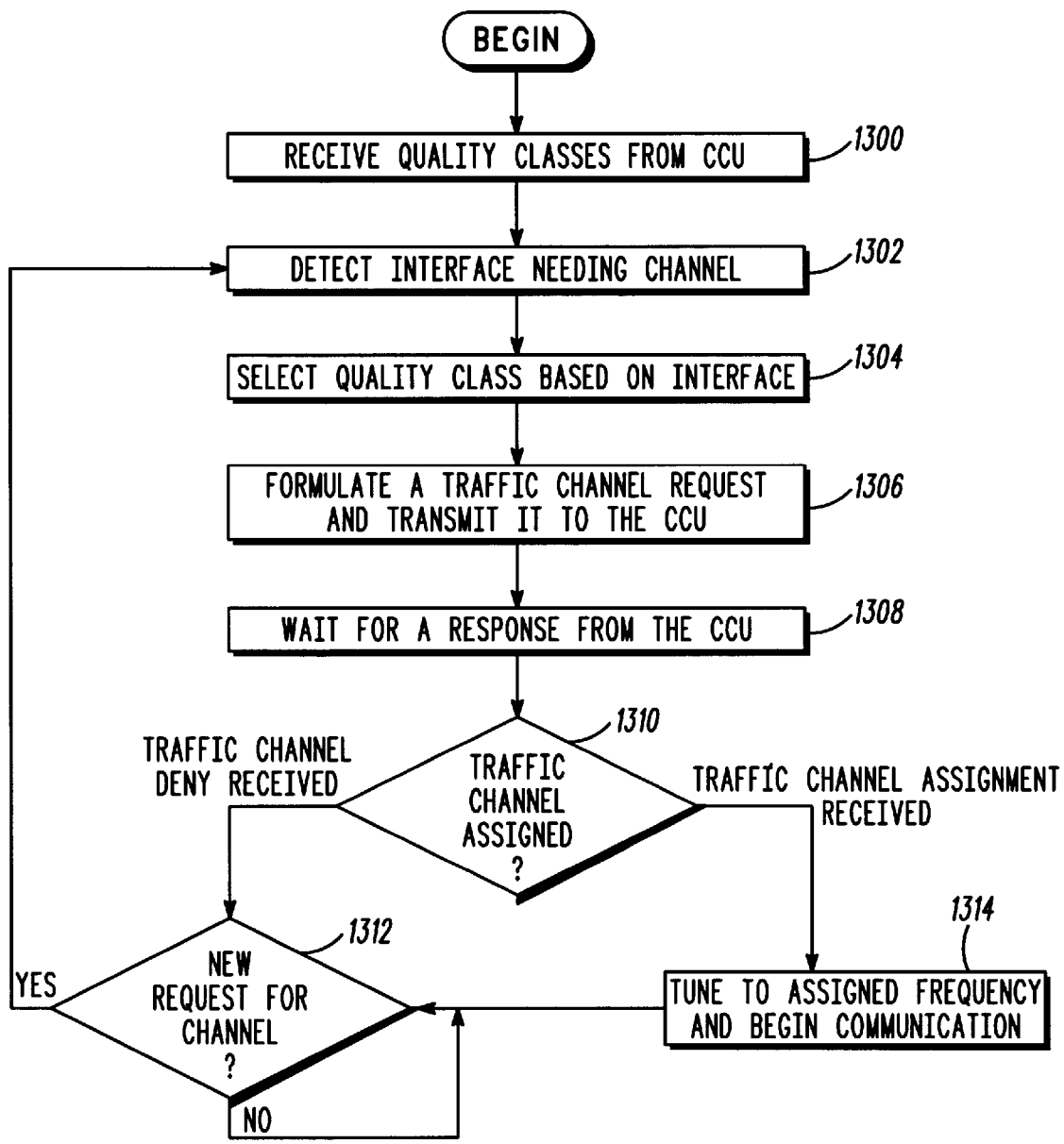
FIG. 13 is a flowchart of a process followed by a CAU requesting and being assigned a traffic channel.

Turning to FIG. 13, a flowchart of a process followed by a CAU requesting and being assigned a TCH is depicted according to the present invention. The process begins by the CAU receiving a set of quality classes from the CCU (step 1300). The process then detects an interface needing a channel for data transmissions (step 1302). The CAU then selects a channel quality class from the set of channel quality classes based on the interface requiring a channel (step 1304). For example, the telephone interface, the ISDN interface, or the video phone interface generates the input which triggers the request. A TCH request is then formulated and transmitted to the CCU (step 1306). Thereafter, the CAU waits for a response in the CCU (step 1308).

Upon receiving a response from the CCU, a determination is made as to whether a TCH has been assigned (step 1310). If the request has been denied, the process determines whether a new request has been made for a channel (step 1312). If a new request has not been made, the process returns to step 1312. Otherwise, the process returns to step 1302. With reference again to step 1310, upon receiving a TCH assignment, the CAU tunes to the assigned frequency and begins its communication or data transfers (step 1314) with the process proceeding to step 1312 to determine whether a request has been made for an additional channel, as described about.

The processes depicted in the diagrams and flowcharts in FIGS. 5–13 may be implemented by those of ordinary skill in the art within the hardware illustrated in FIGS. 1–2C. The processes of the present invention also may be implemented in a storage device that is readable by processors within the hardware depicted above, wherein the storage device encodes executable instructions of the processes of the present invention. The program storage device may take various forms including, for example, but not limited to, a hard disk drive, an optical disk, a ROM, and EPROM, or a RAM, which are known to those skilled in the art.

The processes stored on a storage device are dormant until activated by using the storage device with a processor, such as a microprocessor or a DSP. For example, the processes for managing channels on a communication system may be coded as instructions stored in a hard disk drive or an optical disk. Connecting the hard disk drive with the optical disk to the processor in the CCU allows the processor to execute these instructions and manage channels on the communications system.

Thus, the present invention provides an improved communications system by providing a method for initiating ALTs and assigning traffic channels by collecting quality metrics in uplink and downlink channels. The present invention provides an improved method and apparatus for initiating ALTs by collecting data on word errors, SNR, and ARPLs as quality metrics for determining ALTs. Additionally, the collected quality metrics are used to determine the channel quality of the channels, which are in turn used to assign channels to various CAUs requesting a TCH. The present invention provides an advantage over other methods for assigning channels in that channels are assigned to meet the range of channels defined by the minimum or optimum channel quality associated with a channel quality class and only assigning channels with a greater quality than requested when other acceptable channels are absent.

While the invention has been particularly shown and described with reference to a preferred embodiment, it will be understood by those skilled in the art that various changes in form and detail may be made therein without departing from the spirit and scope of the invention.

What is claimed is:

1. A method for managing channels in a communications system in which communications units are connected to each other by a cable distribution network, wherein signals are sent between communications units in the cable distribution network using a plurality of channels, each of the plurality of channels being assigned a portion of a frequency spectrum, the method comprising:

sending data transmissions between a first communications unit and a second communications unit via a first channel in the plurality of channels, wherein the data transmissions from the second communications unit to the first communications unit are uplink data transmissions and data transmissions from the first communications unit to the second communications unit are downlink data transmissions;

measuring quality metrics for a busy channel, the quality metrics including downlink quality metrics and uplink quality metrics for the busy channel;

measuring quality metrics for an idle channel in the plurality of channels;

identifying and tallying the number of occurrences of quality defects in the busy channel and the idle channel using the measured quality metrics; and managing the sending of data transmissions between the first communications unit and the second communications unit in response to identifying and tallying the number of occurrences of quality defects.

2. The method of claim 1, wherein the step of identifying occurrences of quality defects comprises detecting a word error in a data transmission between the first communications unit and the second communications unit.

3. The method of claim 2, wherein the step of detecting a word error includes detecting a word error in an uplink data transmission from the second communications unit to the first communications unit.

4. The method of claim 2, wherein the step of detecting a word error includes detecting a word error in a downlink data transmission from the first communications unit to the second communications unit.

5. The method of claim 1, wherein the step of identifying occurrences of quality defects comprises detecting, in an uplink data transmission, a signal to noise ratio that is outside of a selected range.

6. The method of claim 1, wherein the step of identifying occurrences of quality defects comprises detecting an attenuation relative to power level value outside of a selected range.

7. The method of claim 1, wherein the step of managing comprises:
   determining a quality value for each of the plurality of channels in response to measuring quality metrics;
   receiving a request from the second communications unit, the request including a range of desired quality values for an assigned channel; and
   assigning a channel to the second communications unit, wherein the channel has a quality value falling within the range of desired quality values.

8. The method of claim 1, wherein the step of managing comprises:
   determining a quality value for each of the plurality of channels in response to measuring quality metrics;
   ranking the plurality of channels in response to determining the quality value for each of the plurality of channels to create a set of ranked channels;
   receiving a request from the second communications unit, the request including a channel quality class that contains an upper channel quality requirement and a lower channel quality requirement; and
   assigning a channel to the second communications unit, wherein the channel is assigned using the set of ranked channels and the quality channel class.

9. A cable communications system including channel quality management, the system comprising:
   cable distribution network;
   a base communications unit connected to the cable distribution network;
   a plurality of communications units connected to the cable distribution network;
   a plurality of channels within the cable distribution network, wherein signals are sent between the base communications unit and the plurality of communications units using the plurality of channels, each of the plurality of channels being assigned a portion of a frequency spectrum; and
   the base communications unit measuring quality metrics for the plurality of channels, the quality metrics including downlink quality metrics and uplink quality metrics for a busy channel and uplink quality metrics for an idle channel; the base communications unit identifying occurrences of quality defects on the busy channel and the idle channel in response to measuring quality metrics, and managing communications within the cable communications system in response to identifying occurrences of quality defects.

10. The cable communications system of claim 9, wherein the base communications unit identifies occurrences of quality defects by detecting a word error in a data transmission between the base communications unit and a communications unit.

11. The cable communications system of claim 10, wherein the base communications unit identifies occurrences of quality defects by detecting a word error in an uplink data transmission from the communications unit to the base communications unit.

12. The cable communications system of claim 10, wherein the base communications unit identifies occurrences of quality defects by detecting a word error in an downlink data transmission from the base communications unit to the communications unit.

13. The cable communications system of claim 9, wherein the base communications unit identifies occurrences of quality defects by detecting, in an uplink data transmission, a signal to noise ratio that is outside of a selected range.

14. The cable communications system of claim 9, wherein the base communications unit identifies occurrences of quality defects in the idle channel by detecting an attenuation relative to power level value outside of a selected range.

15. A cable communications system including channel quality management, the system comprising:
   a cable distribution network;
   a base communications unit connected to the cable distribution network;
   a plurality of communications units connected to the cable distribution network;
   a plurality of channels within the cable distribution network, wherein signals are sent between communications units using the plurality of channels, each of the plurality of channels being assigned a portion of a frequency spectrum;
   first determination means for determining quality metrics for a busy channel, the quality metrics including downlink quality metrics and uplink quality metrics for the busy channel;
   second determination means for determining quality metrics for an idle channel in the plurality of channels by measuring a power level in the idle channel;
   identification means for identifying occurrences of quality defects in the busy channel and the idle channel in response to determining quality metrics; and
   management means for managing data transmission within the cable communications system in response to identifying occurrences of quality defects.

16. The cable communications system of claim 15, wherein the identification means includes means for detecting a word error in a data transmission between the base communications unit and the plurality of communications units.

17. A communications unit in a cable communication including channel quality management, the system comprising:
   an interface adapted for connection to a cable distribution network, wherein a plurality of channels are located within the cable distribution network with a first portion of the plurality of channels being busy channels and a second portion of the plurality of channels being idle channels, each of the plurality of channels being assigned a portion of a frequency spectrum; and
   a processing unit having a number of modes of operation including:
      a first mode of operation in which the processing unit measures quality metrics for the plurality of channels, wherein the quality metrics includes downlink quality metrics and uplink quality metrics for the plurality of channels;
      a second mode of operation in which the processing unit identifies occurrences of quality defects in the plurality of channel in response to measuring quality metrics; and
      a third mode of operation in which the processing unit manages data transmissions within the plurality of channels using the measured quality metrics and identified occurrences of quality defects.

18. The communications unit of claim 17, wherein in the third mode of operation, the processing unit manages the plurality of channels by transferring one of the channels to another portion of the frequency spectrum in response to an occurrence of two consecutive quality defects.

19. The communications unit of claim 17, wherein in the third mode of operation, the processing unit manages the plurality of channels by transferring one of the channels to another portion of the frequency spectrum in response to a plurality of non-consecutive errors occurring within a period or time.

20. The communications unit of claim 17, wherein in the third mode of operation includes the processing unit using the quality metrics determined in the first mode of operation to determine a quality value for each channel within the plurality of channels, and assigning channels to a second communications unit based on the quality value of each channel in the fourth mode of operation and in response to receiving a request for a channel from a second communications unit.

21. The communications unit of claim 20, wherein the request for a channel includes an upper quality value and a lower quality value defining a range of quality values.

22. The communications unit of claim 21, wherein assigning channels in the third mode of operation comprises the processing unit determining whether a channel within the plurality of channels has a quality value within the range of quality values specified by the request and assigning a channel having a quality value closest to the upper quality value in response to more than one channel having a quality value within the range of quality values.

23. The communications unit of claim 22, wherein assigning channels in the third mode of operation further comprises the processing unit assigning a channel having a higher quality value than the upper quality value in response to an absence of a channel having a quality value within the range of quality values.

24. The communications unit of claim 17, wherein the processing unit includes a fourth mode of operation in which the processing unit ranks the plurality of channels to form a set of ranked channels in response to measuring quality metrics from the first mode of operation and assigns a channel to a second communications unit using the set of ranked channels in response to a request from the second communications unit for a channel, wherein the request includes a channel quality class.

25. The communications unit of claim 24, wherein the channel quality class includes an upper channel quality requirement and a lower channel quality requirement and wherein the channel assigned to the second communications unit is a channel having a channel quality closest to the upper channel quality requirement, and greater or equal to the lower channel quality requirement.

26. The communications unit of claim 20, wherein the processing unit comprises a processor and a digital signal processor.

27. A cable communications system including channel quality management, the system comprising:
  a cable distribution network including a plurality of channels, each channel in the plurality of channels being assigned a portion of a frequency spectrum, wherein data transmissions are sent within the cable distribution network using the plurality of channels;
  a plurality of cable access units connected to the cable distribution network;
  a cable communications unit connected to the cable distribution network, the cable communications unit including:
    a controller; and
    a plurality of transceiver units, wherein each transceiver unit within the plurality of transceiver units operates in an idle state and a busy state,
wherein a transceiver unit within the plurality of transceiver units in an idle state measures an attenuation relative to power level on an idle uplink channel within the plurality of channels; a transceiver unit within the plurality of transceiver units in a busy state measures word errors and signal to noise ratios in a busy uplink channel; and a transceiver unit within the plurality of transceiver units in a busy state measures word errors in a busy downlink channel, wherein measurements made by the plurality of transceiver units are utilized in controlling data transmissions within the cable distribution network.

28. The cable communications system of claim 27, wherein the cable communications unit employs the measurements to assign a channel to a cable communications unit in response to a request for a channel from the cable communications unit.

29. The cable communications system of claim 27, wherein the cable communications unit uses the measurements to assign a quality value to each channel and receives a request for a channel from a cable access unit specifying a desired range of quality values for an assigned channel, and wherein the cable communications unit assigns a channel to the cable access unit by assigning a channel within the plurality of channels having a quality value within the desired range of quality values specified by the cable access unit.

30. The cable communications system of claim 27, wherein word errors are measured by determining whether a cyclic redundancy check has failed.

31. The communications system of claim 27, wherein measurements of attenuation relative to power are made by measuring signal power at a transceiver unit and calibrating measured signal power in decibels of signal attenuation relative to maximum linear input of a receiver portion of the transceiver unit.

32. The cable communications system of claim 27, wherein a signal to noise ratio is measured by measuring an attenuation relative to power level on an idle channel and measuring an attenuation relative to power level on an active channel and subtracting the attenuation relative to power level on the active channel from the attenuation relative to power level on the idle channel.

33. The communications system of claim 27, wherein the cable communications unit employs the measurements to determine when to assign a channel another portion of the frequency spectrum.

34. The communications system of claim 27, wherein the cable communications unit employs the measurements to assign a channel to a cable access unit.

35. A cable communications unit in a cable communications system including channel quality management, the cable communications unit comprising:
  an interface adapted to be coupled to a cable distribution network;
  a plurality of transceiver units connected to the interface; and
  a controller connected to the plurality of transceiver units, wherein an idle transceiver unit within the plurality of transceiver units measures an attenuation relative to power level on an idle uplink channel, and a busy transceiver unit within the plurality of transceiver units measures word errors and signal to noise ratios on a busy uplink channel and word errors on a busy downlink channel, wherein measurements made by the idle transceiver unit and the busy transceiver unit are utilized in controlling data transmissions within the cable distribution network.

36. A storage device readable by a processor in a communications unit and encoding processor executable instructions for managing traffic channels within a cable communications system including channel quality management, the storage device comprising:

first instructions measuring quality metrics for busy uplink and busy downlink channels;

second instructions measuring quality metrics for idle uplink channels; and third instructions controlling data transmissions within the cable communications system in response measuring quality metrics, wherein the first, second and third instructions are active when the storage device is connected to a processor.

37. The storage device of claim 36, wherein the storage device comprises a combination of a plurality of separate storage devices.

38. The storage device of claim 36, wherein the storage device is a hard disk drive.

39. A subscriber communications unit in a communications system including channel quality management, the subscriber communications unit comprising:

an interface adapted for connection to a cable distribution network in a communications system; and a processor connected to the interface in which the processor has a number of modes of operation including:

a first mode of operation in which the processor identifies a range of channel qualities based on a type of data transmission to be made between the subscriber communications unit and the communications system;

a second mode of operation in which the processor sends a request to the communications system for a channel, wherein the request includes the range of channel qualities identified in the first mode of operation; and a third mode of operation in which the processor receives a response to the request sent in the second mode of operation.

40. The subscriber communications unit of claim 39, wherein the response includes a channel assignment falling within the range of channel qualities identified in the first mode of operation.

41. The subscriber communications unit of claim 39, wherein the response denies the subscriber communications unit a channel assignment.

42. The subscriber communications unit of claim 39, wherein the request includes an indication that a channel having a quality less than channel qualities within the range of channel qualities is acceptable.

43. A storage device readable by a processor in a communications unit in a communications system including channel quality management, the storage device encoding processor executable instructions, the storage device comprising:

first instructions identifying a range of channel qualities based on a type of data transmission to be made between a subscriber communications unit and the communications system;

second instructions sending a request to the communications system for a channel, wherein the request includes a range of channel qualities identified by the first instructions; and third instructions receiving a response to the request sent in the second instructions, wherein the first, second and third instructions are activated when the storage device is connected to a processor.

44. A communications unit for use in a cable communications system including channel quality management, the communications unit comprising:

an interface adapted for connection to a distribution network in the cable communications system, the interface providing a connection for sending and receiving data transmissions on the distribution network, wherein data transmissions are transmitted on a plurality of channels, each channel being assigned a portion of a radio frequency spectrum, in which the portion of the radio frequency spectrum is divided by time into a plurality of time slots; and;

a receiver connected to the interface, wherein the receiver receives modulated data signals from the interface and converts the modulated data signals into digital data;

a transmitter connected to the interface, wherein the transmitter converts digital data into modulated data signals for transmission onto the cable communications system;

a processing unit connected to the transmitter and the receiver;

a subscriber loop interface adapted to be connected to user equipment; and a pulse code modulated coder/decoder unit connected to the transmitter, the processing unit, and the subscriber loop interface, wherein digital data containing user data is converted into an analog form for use by a user and wherein analog data from a user is converted into a digital form, wherein the processor obtains a set of channel quality classes from the cable communications system, selects a channel quality class from the set of channel quality classes based on a type of data transmission to be made between the cable communications unit and the cable communications system, sends a request to the cable communications system for a channel, wherein the request includes the channel quality class, and receives a response from the cable communications system.

45. The cable communications system of claim 44, wherein each channel quality class includes an upper channel quality value and a lower channel quality value defining a range of channel qualities required by the cable communications system.

46. The cable communications system of claim 45, wherein the response includes an assignment of channel having a channel quality falling within the range of channel qualities.

47. The cable communications system of claim 45, wherein the response denies an assignment of a channel to the cable communications system.

48. The cable communications system of claim 45, wherein the request includes an indication that a channel falling below the lower channel quality value is acceptable if a channel falling within the range of channel qualities defined by the upper channel quality value and the lower channel quality value is absent.

* * * * *